Feb. 12, 1963 T. A. ROZSA ETAL 3,077,408
CEREAL FLOUR FRACTIONATION PROCESSES
Original Filed Nov. 22, 1954 4 Sheets-Sheet 1
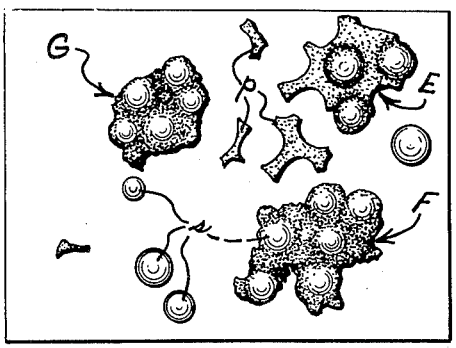
FIG. 1 — SOFT WHEAT
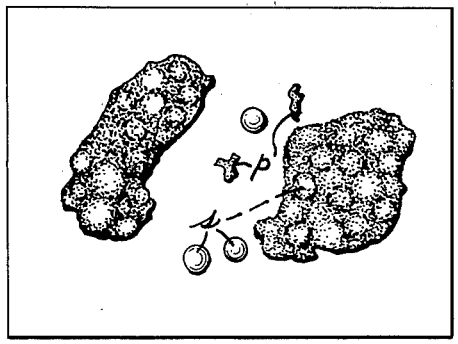
FIG. 2 — HARD WHEAT
SCALE 250 TO 1
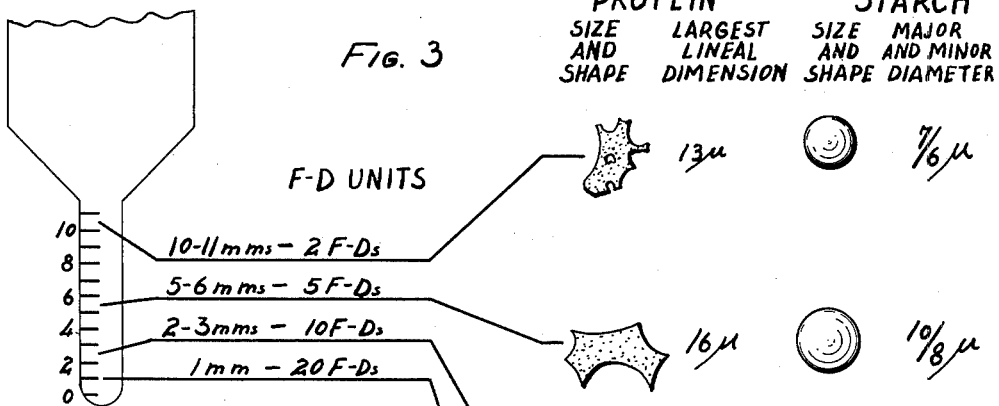
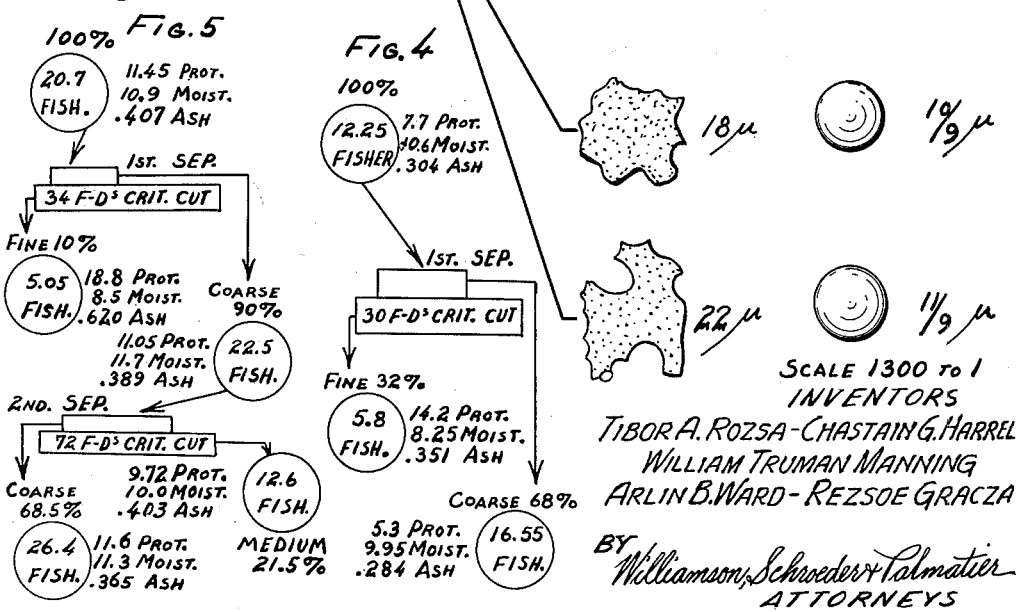
INVENTORS
TIBOR A. ROZSA - CHASTAIN G. HARREL
WILLIAM TRUMAN MANNING
ARLIN B. WARD - REZSOE GRACZA
BY Williamson, Schroeder & Palmatier
ATTORNEYS

Fig. 6
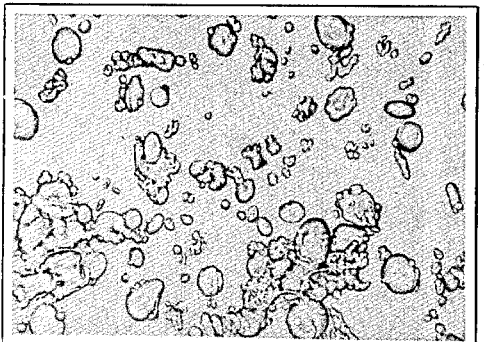
SCALE MICRONS 0 100 200
PARENT FLOUR SOFT WHEAT
Fig. 7
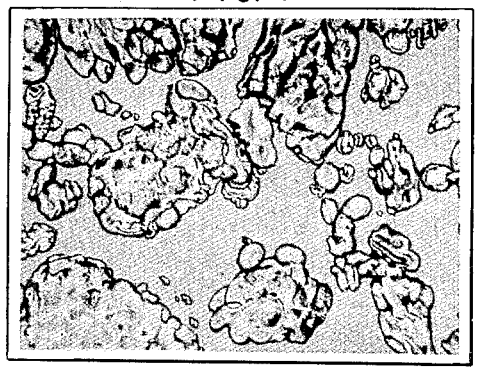
PARENT FLOUR HARD WHEAT
Fig. 8
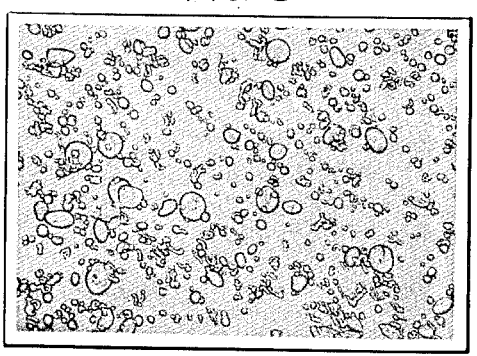
FINES 30F-D CUT SOFT WHEAT
Fig. 9
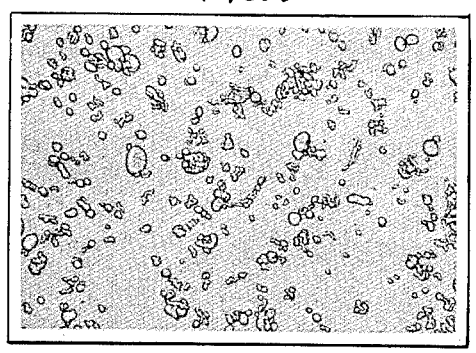
FINES 30F-D CUT HARD WHEAT
Fig. 10
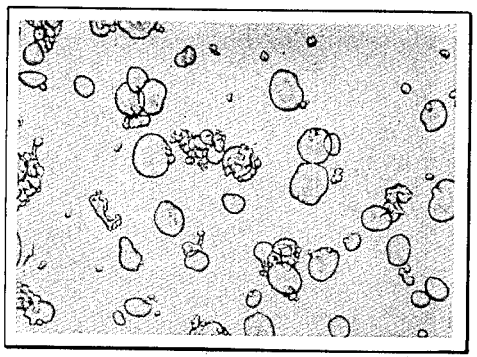
COARSE FRACTION SOFT WHEAT
1ST STAGE Fig. 11
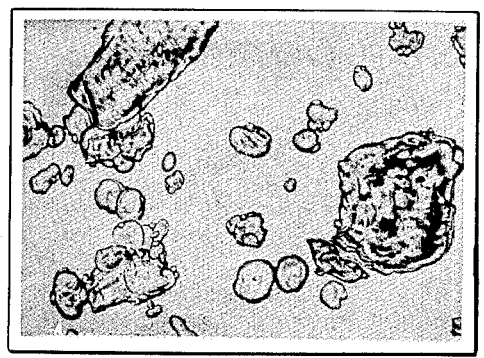
COARSE FRACTION HARD WHEAT Feb. 12, 1963 — T. A. ROZSA ETAL — 3,077,408
CEREAL FLOUR FRACTIONATION PROCESSES
Original Filed Nov. 22, 1954 — 4 Sheets-Sheet 3
2ND STAGE FIG. 12
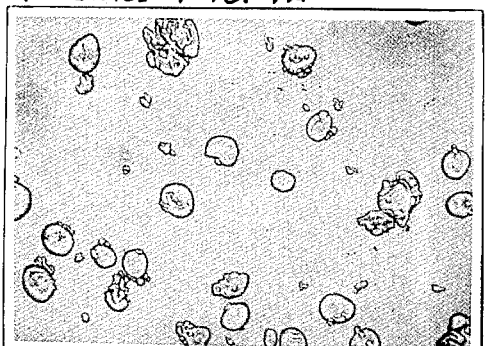
FINER FRACTION HARD WHEAT
2ND STAGE FIG. 13
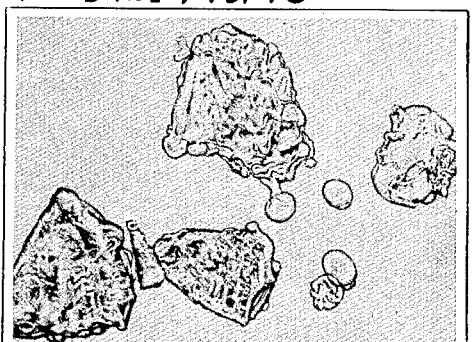
COARSE FRACTION HARD WHEAT
FIG. 14
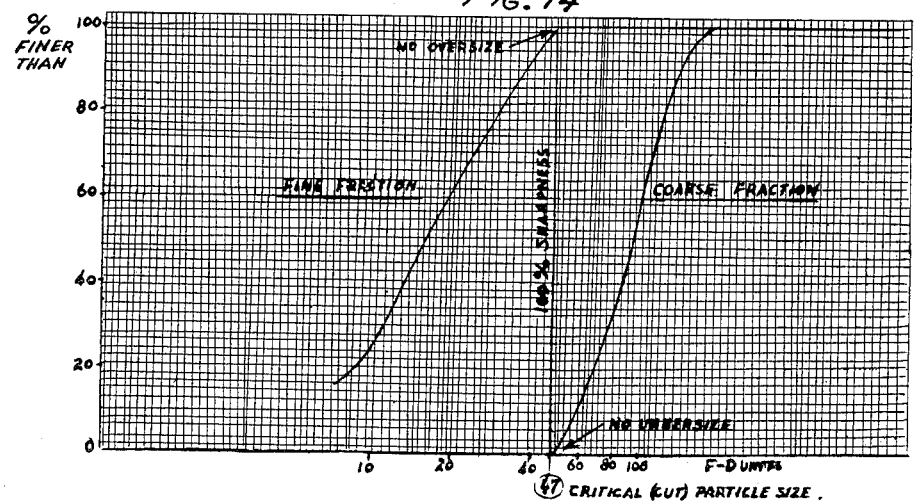
FIG. 15
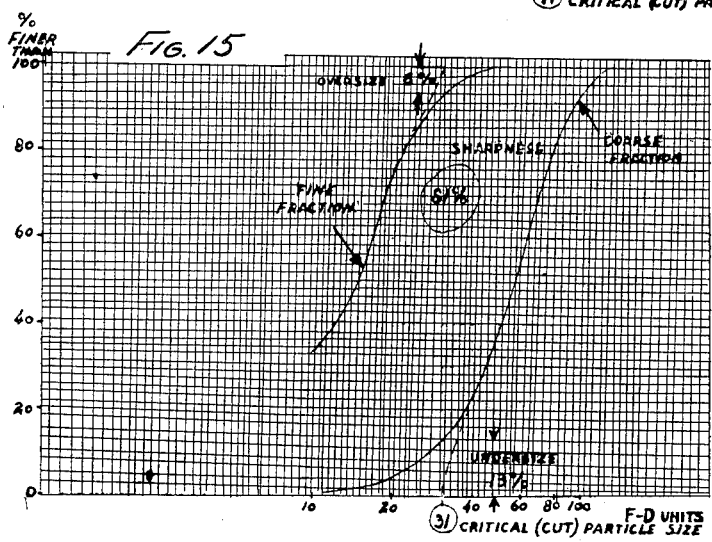
INVENTORS
TIBOR A. ROZSA
CHASTAIN B. HARREL
WILLIAM TRUMAN MANNING
ARLIN B. WARD
REZSOE GRACZA
BY Williamson,
Schroeder, Halmatier
ATTORNEYS Feb. 12, 1963 T. A. ROZSA ETAL 3,077,408
CEREAL FLOUR FRACTIONATION PROCESSES
Original Filed Nov. 22, 1954 4 Sheets-Sheet 4

PARENT FLOUR
SOFT WHEAT

FINE FRACTION
PROTEIN CONCENTRATION
SOFT WHEAT

COARSE FRACTION
SOFT WHEAT

INVENTORS
TIBOR A. ROZSA – CHASTAIN G. HARREL
WILLIAM TRUMAN MANNING
ARLIN B. WARD – REZSOE GRACZA
BY
Williamson, Schroeder, Palmatier
ATTORNEYS United States Patent Office 3,077,408
Patented Feb. 12, 1963

3,077,408
CEREAL FLOUR FRACTIONATION PROCESSES
Tibor A. Rozsa, Chastain G. Harrel, William Truman Manning, Arlin B. Ward, and Rezsoe Gracza, all of Minneapolis, Minn., assignors to The Pillsbury Company, Minneapolis, Minn., a corporation of Delaware
Continuation of application Ser. No. 470,244, Nov. 22, 1954. This application Dec. 28, 1959, Ser. No. 862,099
6 Claims. (Cl. 99—93)

This invention relates to the fractionation of milled, cereal flours with the attendant production commercially and economically, from a single flour source, of two or more premium products having commercial significance and each having materially different chemical and physical characteristics, as well as being significantly different from any products of the prior art.

Basically, our invention consists in the discovery that milled, cereal flour stock may be consistently fractionated by air separation at heretofore unknown ranges of critical-cut, to withdraw from the parent flour stock in one fraction substantially all discrete, protein-matter particles, and simultaneously to produce a relatively large-volume fraction, high in starch content and substantially depleted of discrete protein particles and the matters which contribute to high ash characteristics.

More specifically, our invention comprises novel air separation methods for effecting consistently and accurately the fractionation defined in the preceding paragraph together with the discovery of fluid-dynamic characteristics and measurements of the various particles contained in flour stocks and with the inclusion therein of certain heretofore unseparated protein-matter particles.

A number of projects have been undertaken to investigate fractionation of milled flour stocks with a view to separating flour into fractions having commercial significance. Recent reports disclosing developments in fractionation include the published Kansas State College Agricultural Experiment Station Technical Report, April 1950, by J. A. Shellenberg, Frank W. Wichser and R. O. Pence, and a report by Rae H. Harris of North Dakota Agricultural Experiment Station, Fargo, North Dakota, entitled "Flour Particle Size as Influenced by Wheat Variety and Location of Growth."

Prior to our invention, none of the known authorities discovered, first, that the most concentrated protein-matter particles of cereal flour are contained within the fines or "throughs" of the "sub-sieve" size (passable through the finest W. S. Tyler Company test sieve having 400 meshes to the linear inch and of what is termed 38 micron size) and that, secondly, such minute protein-matter particles may substantially all be separated from the parent flour stock by air separation with the help of fluid-dynamic measurements and principles. In fact, the exhaustive Wichser report states that the more concentrated proteins are found in wheat particles over 38 microns in size and which will not pass through the 400 mesh experimental sieve.

The application of our discoveries to commercial production has been facilitated and made standard after our development of a novel method of unit measurement for fluid-dynamic characteristics of the various particles of cereal flours. Such measurement expressed in units are hereinafter referred to as "F-D units."

The foregoing features and other accomplishments of our invention will be more apparent from the following description, made in connection with the accompanying drawings wherein like reference numerals refer to the same or corresponding parts in the several views and in which:

FIGURE 1 is a plan view on highly magnified (approximately 250 times) scale, showing typical fragments of endosperm cells of soft wheat with the individual starch granules imbedded in a homogeneous, somewhat translucent protein matrix;

FIGURE 2 is a similar view showing several typical fragments of hard wheat endosperm cells wherein the protein matrix is less translucent;

FIGURE 3 is a diagrammatic chart summarizing certain findings, proofs and results obtained by sedimentation test of the air separated, smallest wheat flour particles with subsequent powerful microscopic examination of such particles from predetermined strata in the lower collecting end of a gravimetrically and centrifugally actuated sedimentation tube;

FIGURE 4 is a simple flow diagram illustrating diagrammatically the carrying out of a simple embodiment of our invention;

FIGURE 5 is a simplified flow diagram illustrating the steps of our novel method applied to treatment of typical, milled hard wheat flour stock with two stages of air separation to produce two or three commercial premium products;

Figure 16:
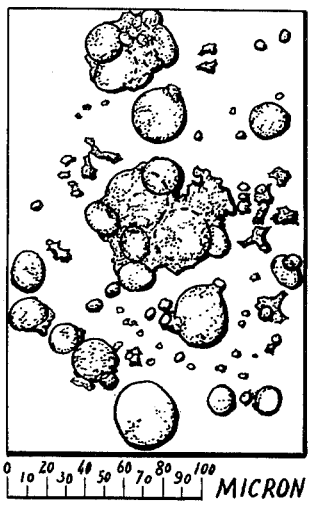
Figure 17:
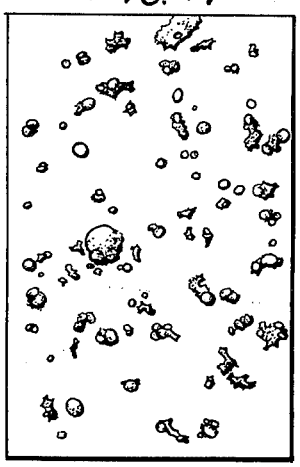
Figure 18:
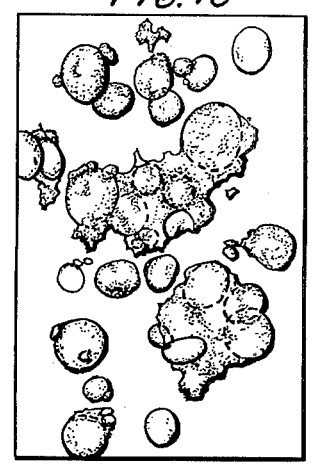
Figure 19:
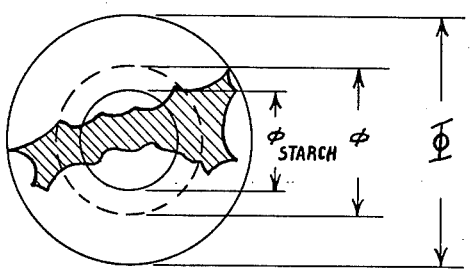
Figure 20:
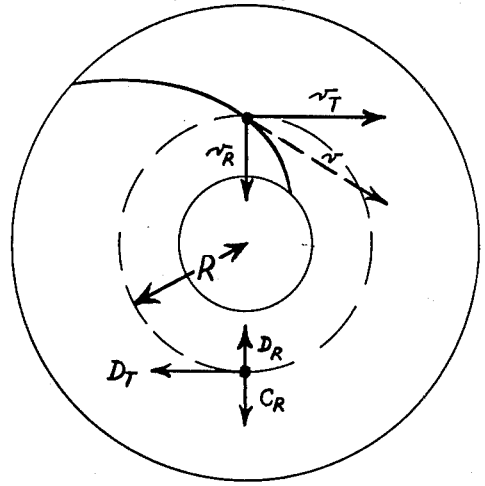

FIGURES 6 and 7 illustrate, on a scale of magnification of approximately 270 to 1, typical particles and particle distribution of commercial milled soft wheat and hard wheat flours respectively, samples having been placed upon a slide and thinly spread in mineral oil (refractive index 1.505) to obtain photo-micrographs from which said illustrations were made;

FIGURES 8 and 9 illustrate, on a similar scale of magnification, typical particles and particle distribution of the fine fractions obtained on the soft wheat and hard wheat samples respectively illustrated in FIGURES 6 and 7 through the utilization of our invention;

FIGURES 10 and 11 illustrate, on a similar scale of magnification, typical particles and particle distribution of the coarse fractions obtained from soft wheat and hard wheat flour stock or samples illustrated in FIGURES 6 and 7 through the employment of our invention;

FIGURES 12 and 13 illustrate the fine and coarse fractions respectively on a similar scale of magnification, of hard wheat flour resulting from a second-stage air separation of the coarse fraction shown in FIGURE 11 on a "critical-cut" of 72 F-D units. The said fractions resulted from the process diagrammed in the flow sheet of FIGURE 5, FIGURE 12 showing the medium fraction from said last mentioned cut, and FIGURE 13 showing the coarser fraction from said cut;

FIGURES 14 and 15 are graphs illustrating our novel method of determining "critical-cut" through air separation and efficiency of the respective "critical-cut" separations;

FIGURES 16 to 18, inclusive, illustrate on a scale of magnification indicated by the micron scale underlying FIGURE 16 a parent soft wheat flour material, the fine fraction obtained for protein concentration and the coarse fraction respectively obtained in a single-stage air separation operation, embodying our invention, at a critical-cut of 16½ F-D units;

FIGURE 19 is a diagrammatic view including an abstract sketch on greatly enlarged scale of a particular protein-matter particle with legends and symbols correlating applicants' explanation of relative shape factors with subsequent definitions thereof in Appendix C; and FIGURE 20 is a diagrammatic view illustrating velocity vectors and force vectors acting upon a certain particle in general vortex-type of air classifiers, where the forces in radial direction, are in equilibrium (referred to in Appendix B).

We believe we are the first to discover in commercially milled, cereal flour stocks, the existence of a large number of discrete, extremely fine, highly concentrated, protein particles. The said particles contain an average of 93% protein, on a dry basis. The 7% not accounted for represents a small percentage of lipoids, mineral matter with a trace of carbohydrates and cellular wall material.

We also believe we are the first to discover any method or means for substantially concentrating protein-matter particles from a flour stock by dry process.

As a result of our discoveries and our novel air separation methods, unexpected results (new products) as compared to any other existing classifying procedures have been attained. Classification by air flow or fluid-dynamic principles use shape, size and density simultaneously in their complex principles of classification. Classification method by sieve and sifter process is objectionable and inaccurate for several reasons, to wit:

(1) Because of variations and different levels of moisture content in the stock, with the resultant changes or variations in electrostatic effects;

(2) Because of variations or change in the feed rate;

(3) Because of varying fat content of the stock utilized;

(4) Because of the shifting motion or gyration of the sieves often deflecting or hindering passage of particles through the sieve openings;

(5) Because sieve openings provide a measurement based, not even on three dimensions of the particles, but only on two dimensions, whereby elongated particles may lodge crosswise of the openings. It will be obvious that two dimensions cannot satisfactorily represent particle size;

(6) No perfect bolting cloth exists and the inaccuracy of the disposition of the respective cross textile filaments is increased by continuous use.

The foregoing limitations and objections result in a very imperfect classification through sieve operations as judged by the sharpness of separation, which is considered to be a criterion of efficiency. The result of sieve separation is that many oversized particles remain with the "throughs" and even a greater proportion of undersized particles remain in the "overs."

In our discoveries, efficient air separation is used at unexpected and newly discovered "critical-cuts." The "critical-cut" of commercial air separation as used herein is the graphically derived particle size, expressed in our F–D units, at which the total percentage of the oversize particles in the fine fraction and the percentage of the undersize particles in the coarse fraction are at a minimum. An explanation of how we determine "critical-cut" graphically is given later herein.

For a long period of time, we carried out an exhaustive series of air separation tests on conventionally milled cereal flours including soft and hard wheat, rye, barley, corn and durum and rice. In such tests with the use of several commercial air separators or classifiers, we varied the several adjustments to successively vary critical-cuts upon the flour stocks utilized. During such experiments, where continuously smaller fractions were drawn off from the parent flour stock, a point was reached below "sub-sieve" size range where, contrary to the teachings of the prior art, protein content in the small and fine fraction withdrawn, by chemical analyses, was increasing at a rapid rate as our critical-cut decreased. Such unexpected discovery led to many tests of both the finer (and much smaller) fraction and the larger fraction produced in numerous instances and further led to microscopic examination of a great number of fractions separated.

We then realized, because of the great variety of shapes and sizes and further differences in density of typical flour particles, that a method and unit standard for evaluating the several fluid-dynamic characteristics was essential to determine and define the discoveries we had made. The factors of density, size and shape need to be evaluated at first individually and then together, and/or postulated to define our invention in critical terms.

With the utilization of fluid-dynamic, sedimentation tests carried out under the method and with the apparatus disclosed in the United States patent application of Kenneth Whitby, Serial Number 329,411 (assigned to our assignee, Pillsbury Mills, Inc.), we were able to devise a new method of fluid-dynamic evaluation of the various particles found in cereal flour stocks, taking into consideration density, size and shape and expressing such flow-dynamic characteristics in measurable units. Said method and unit evaluation has been previously referred to and the mathematical basis for the same is carefully explained in the appendix hereto constituting a part of the detailed description hereof and positioned ahead of the claims. The units of measurement shall be referred to hereafter as "F–D" units.

In efficient, commercial air separators, several adjustments are available to vary the critical-cut of separation. They include the following:

(1) In the case of rotary separators or classifiers, the r.p.m. of the classifier rotor; in the case of classifiers which do not employ a rotor, the variance in the tangential velocity of the particles. Such changes vary the centrifugal force action on the particles.

(2) The speed of air flow, or cubic feet per minute through the classifier. Adjustment of this factor will vary the centerward component of drag on the particles.

(3) The rate of feed supply or cwt. per hour of material fed to the air separator. In general, increasing the feed rate slightly lowers the critical-particle size.

(4) Mechanical elements now on several types of air separators and which may be added to others to vary the directional angle of entering air currents.

(5) In the case of rotary classifiers having more-or-less radial blades adjacent their peripheries, the inside and outside radii of such blades.

(6) Variance in the diameter of the air and fine particle discharge passage (sometimes referred to as the fan inlet opening) between the classifier zone and the fan.

(7) Variance in other structural elements of the classifier.

In completing our discoveries and invention, we made use of the variable adjustments of efficient, commercial, air separators available to us, and correlated with such adjustments our evaluation of fluid-dynamic characteristics and measurements of particles, and then were able to attain optimum results in the withdrawal of protein-matter particles from milled, cereal flour stocks as well as in obtaining maximum depletion of protein-matter particles and matters contributing to high ash-content of the coarser fraction. Our discoveries of the inherent characteristics, sizes and shape of discrete, pure, protein particles and the fluid-dynamic relation of the same with discrete starch-granule particles constituted an important factor in the perfection of our invention. An explanation of velocity and force conditions when particles are subjected to vortex-type air separation, is set forth in Appendix B hereof.

While, with the proper adjustments along the several lines previously indicated, numerous air separating machines and air classifiers are adequate for consistently and accurately carrying out the different steps of our new processes, we list below several commercial machines which have been available and utilized by us and properly adjusted to produce successful results and the novel products of our invention.

(1) Sturtevant Whirlwind Centrifugal Separator, manufactured by Sturdevant Mill Co., of Boston, Mass.

(2) Commercial structures of the Carter Patent No. 2,633,930 (licensed to Superior Separator Company of Hopkins, Minn.);

(3) Improved centripetal of classifier embodying the machine disclosed in United States patent application, Serial No. 306,126, of H. G. Lykken;

(4) Commercial analyzer machine (for experimental use) disclosed in U.S. Patent No. 2,019,507, "Apparatus for Fractionating Finely Divided Material," of Paul S. Roller.

We found we were able to define, in terms of fluid-dynamic units (F–D units) the ranges of critical-cut for optimum results, first in the concentration of maximum protein-matter ingredients and secondly in the depletion, in the coarser and larger fraction, of protein and high ash-containing ingredients. These ranges are as follows:

For protein concentration—
    Hard wheat flour—18 to 30 F–D units
    Soft wheat flour—15 to 25 F–D units
    White rye flour—15 to 25 F–D units
    Dark rye flour—18 to 25 F–D units
    Corn flour—20 to 35 F–D units For protein and ash depletion in coarse fraction—
    Hard wheat flour—25 to 40 F–D units
    Soft wheat flour—20 to 35 F–D units
    White rye flour—20 to 35 F–D units
    Dark rye flour—20 to 35 F–D units
    Corn flour—25 to 40 F–D units In connection with the above defined ranges, it is to be remembered that the harder and higher protein endosperm has poorer grindability. Consequently, it is usually ground to coarser average particle size flour. In the above ranges, where hard wheat fragments are specified, such include durum.

In discovering the range of critical-cuts for maximum protein concentration and optimum protein and ash depletion for various milled flour stocks by utilization of efficient air separation, we unexpectedly discovered the existence of a point or zone hereafter referred to as the "neutral critical-cut," above which air separation at successively higher critical-cuts will consistently produce a fine fraction having a protein content smaller than the coarser fraction produced. Below said "neutral cut," all critical-cuts successively made on a decreasing scale will result in production, as has been previously indicated, of a fine fraction having protein content substantially higher than the protein content of the coarser fraction obtained in each instance. In the said zone, a critical-cut or critical-cuts carried out by our exhaustive tests show that the air-separated fine fraction and the coarse fraction obtained simultaneously have the same protein content as the parent stock. The optimum critical-cut ranges for protein concentration of the fine fraction and protein and ash depletion of the coarse fraction defined on the preceding page are all substantially below said neutral critical-cut or zone and, as previously stated, the fine fractions are consistently of average particle size substantially below the average particle size by Fisher of the "throughs" obtained in sieve and sifting operations by use of the finest (400 mesh lineal inch) experimental sieve available.

The "neutral critical-cut" ranges for the various milled cereal flour stocks as discovered by us, are as follows:

For soft wheat flours—42 to 60 F–D units
For hard wheat flours (including durum)—51 to 69 F–D units
For white rye flours—52 to 68 F–D units
For dark rye flours—40 to 56 F–D units
For corn flours—36 to 52 F–D units Theoretically and scientifically, all air separations made on critical-cuts above said "neutral critical-cut" result in fractionation of a cereal, flour stock wherein the fraction having the smaller or finer particle size contains less protein than the other fraction having coarser particle size. The reverse of such rule or finding is true relative to all air separations made on critical-cuts below the "neutral critical-cut" to the end that there the finer fraction always contains more protein than the coarser fraction. Such we find is consistent with the morphology of cereal endosperm particles. These discoveries are directly contrary to the reports and findings of experiments in known prior art where a sieve separation was utilized in one or more stages of the experiment. We have definitely concluded that critical-air separations within the scope of our discoveries brought about particle size classification of a very different character than separations performed where a screen or sifter is used.

We further found, through exhaustive analyses of our fractions produced by critical-air separations within the ranges heretofore defined in column 5, lines 6–18 hereof, that the respective products have novel and different chemical and physical characteristics as contrasted with any cereal flour fractions produced before our discovery, and furthermore, gave substantially improved and new end results in the production of baked products made from our novel fractions.

The selected critical-cut within the ranges heretofore set forth is dependent upon the type of the cereal flour and type and intensity of grinding applied. Different grinding machines produce different particle shapes and the particle shape influences the critical-cut. In general, the finer the granulation of the parent flour material, the lower will be the critical-cut within the ranges expressed, and the higher the protein content of the parent material, the higher will be the critical-cut within the ranges expressed.

Generally speaking, the optimum amount of the fine fraction pulled out of the parent flour material for protein concentration varies between 3% and 17% of the total flour stock fed into the properly regulated air classifier. The coarser the parent stock, the less the proportion of optimum protein, fine fraction obtainable. For example, we have made air separations at the appropriate critical-cut upon middlings and there the fine fraction removed was only 2% and contained 18.5% protein, whereas the protein content of the coarse fraction was 9.6% and the protein content of the parent stock was 9.8% (all calculated on 14% moisture basis). When flour milled from the same wheat stock having a protein content of 10.3% was separated at the optimum critical-cut in accordance with our invention, the removed fine fraction constitutes 10% of the original stock and had a protein content of 20.6% while the coarse fraction had a protein content of 9.6%.

The smaller and finer fractions obtained by our processes, within the respective critical cut ranges set forth in column 5, lines 6–18, both for protein concentration and when depletion of protein and ash is desired, contain most of the lipoids as well as mold spore of the parent stock. From our knowledge and our analysis microscopically of the fine fractions obtained, we have determined that with efficient air separators capable of making critical cuts down to 8 F–D units, a large percentage of the high ash-contributing particles of the parent stock may be withdrawn at a critical cut range between 8 to 16 F–D units without substantially depleting the parent stock of protein matter particles.

In order to obtain the hereindescribed optimum results (maximum protein concentration and depletion in the respective two fractions), in addition to the critical-cut data, it is essential that knowledge for the performance of separation concerning the products be as complete as possible and that sharpness of classificaiton should be the goal.

To this end, in evaluating our discovery after conception of our system of fluid-dynamic evaluation of the various and sundry particles and expression thereof in F–D units, it was desirable to plot the results of tests to show size frequency distribution and to determine critical-cuts and the efficiency of the separation.

Accordingly, we conceived and worked out a method of evaluation of air separator performance and critical-cuts which constitutes a part of our invention and enables us to classify and define in terms of said fluid-dynamic units (F–D units), the critical-cuts and the efficiency of separation in obtaining our desired results. To illustrate the method of such evaluation which we conceived, two graphs are shown in FIGURES 14 and 15 of the drawings of this application, laid out on semi-logarithmic graph paper which, for our purposes, seems most desirable. The sedimentation tests reveal how many percent of the particles in the fine fraction are coarser than the size at which the separation was supposed to take place. Similarly, said tests revealed to us how many percent of the particles in the coarser fraction are finer than the size at which the separation was intended. On the horizontal lines of the graph shown in FIGURES 14 and 15, the particle size is plotted in F–D units and the vertical line shows in percentages what proportion of the sample is finer than the corresponding particle size. The Whitby sedimentation test is particularly suitable for the measurements of air-separator performance since both air separator and liquid sedimentation operate on the same general principle.

In FIGURE 14, we illustrate an over-simplified case of a hypothetical, ideal separation; an illustration, of course, of abstractly perfect performance with 100% sharp separation. Every particle in the fine fraction is finer than 47 F–D units and every particle in the coarse fraction is coarser than a measurement of 47 F–D units. We choose to call the particle size at which such separations take place, the "critical-cut." It will be noted that a curve has been plotted for both the fine fraction and the coarse fraction. To determine from the two curves the critical-cut, we select that particle size from the curves at which the over-size particles in the fine fraction and the under-size particles in the coarse fraction are at minimum and which, on the graph, is the vertical line coincident where the two cumulative curves are the farthest apart. We draw a vertical line in FIGURE 14 along an F–D unit line of 47, indicating the critical-cut expressed in our fluid-dynamic units. We find that such distance between the two curves on said perpendicular line, measures the sharpness of separation, in that this line is parallel to the line of the graph which denotes the percentage finer than the corresponding particle size on the line. We can, therefore, read the distance between the two cumulative curves in the same scale which is plotted on the axis and read the sharpness of the separation directly in percentage.

The second graph illustrated in FIGURE 15 shows the actual performance in our experience of an efficient air separation when adjusted as previously indicated to commercial high efficiency. The cumulative particle size curve of the coarse fraction (representing 85% of the original material) is plotted and the second or upper curve is plotted representing particle size distribution of the smaller and finer fraction constituting 15% of the sample or parent stock material air classified. By such plotting of actual air separator performance to determine the critical particle size of separation, we select that particle size from the curves at which the total of the over-size percentage in the fine fraction and the undersize percentage in the coarse fraction are at their minimum. That is what a critical separation should accomplish, self evidently at such a critical particle size (31 F–D units in this instance) the vertical distance is greatest between the two cumulative curves. This vertical distance is the "sharpness of the separation"—81% in this instance. The over-size in the fine fraction may be read on the graph as 6% and the undersize particles in the coarse fraction are shown by the graph to constitute 13%. It is very easy and rapid to find, with a straight edge, the place of the greatest vertical distance between the cumulative curves of the coarse and fine fraction. The foregoing is our conceived method for determining at what critical particle size expressed in fluid-dynamic units (F–D units) the separation took place and, furthermore, what the efficiency or sharpness of the separation amounted to.

Having now generally disclosed our invention which comprises several novel discoveries and which includes the essential method steps, ranges of critical-cuts and the novel and patentable resultant products or flour fractionations, we will not point out more specifically, the results obtained, the significance of our discoveries and some of the proofs of the substantially complete separation from milled cereal flour stocks of the discrete-protein-matter particles.

With the use of our evaluation of fluid-dynamic characteristics expressed in our F–D units and our determination of the critical-cuts (expressed in F–D units) and efficiency of adjusted vortex-type air classifiers, we have been able to commercially repeat our methods on the milled flours of hard wheat, soft wheat and rye and, in addition, have found our method to be highly efficient in the treatment of corn flour to remove or concentrate fat, ash and protein matter. It must, of course, be remembered that many fragments of endosperm cells as well as agglomerates of protein-starch are present in the available milled flour stocks and, unless further broken up through attrition of the particles in the air classification, will remain with the coarse fraction obtained in our method. Some attrition reduction of particles by impact inherently does take place in air separation and our tabulation of results indicates that at least some of the agglomerates are broken down into discrete starch granules and discrete protein-matter particles.

At the critical-cut ranges heretofore specified for soft wheat fractionation in many cases the percentage protein content of the fine fraction can be increased to 2½ times that of the original flour stocks, the increase in protein of the fine fraction as compared with the milled flour stock utilized being consistently about two-fold in fractionating with our method hard wheat flour stocks. In the case of white rye flour, the concentration of protein of the fine fraction obtainable at the critical-cuts hereafter specified in examples given, approximates twice that of the original rye flour.

Referring now to FIGURES 1 and 2 of the drawings, these were produced by us as a result of our own intensive observations on visual examination microscopically at magnifications (ranging with different microscopes from 75 to 322 times the actual size). The illustrations of FIGURES 1 and 2 are also in strict accord with existing authorities on the morphology of cereal endosperm. The symmetrical or ovoid granules we know are starch granules. The encysting portions in which these granules are imbedded we know to be generally homogeneous protein matter and the fats normally accompanying the same, this constituting in endosperm cells of cereal grains, a matrix or mass in which the ellipsoid, starch granules (varying substantially in size) are originally imbedded and retained. The starch granules are very closely spaced in the imbedding matrix and this protein matter generally is narrowed very appreciably between the most adjacent portions of adjacent starch granules and at such narrowed portions, is almost always thinner or narrower than the diameters of even the smaller starch granules in the protein matrix. We discovered that, in the normal milling operations of commercial mills including the "break" steps and the later reduction steps, the starch granules will often remain intact while the previously adhering protein of the matrix having less cohesion will crack or break from the starch granules along the weaker lines and narrower portions between adjacent starch granules, thereby freeing a number of whole, discrete starch granules s while producing relatively small, very irregular shaped fragments of protein such as those indicated in FIGURES 1 and 2 by the letter p which have a number of concave curves or recessed in the periphery thereof, of a complementary shape to portions of the starch granules which previously were connected thereto.

In the case of soft wheat, the grindability is much greater as supported by leading authorities, as well as our own findings; the protein matrix is less hard and FIGURE 1 typically illustrates in particles E, F and G, the tendency of starch granules to overhang or protrude from the general edges of the protein matrix in which the same are imbedded with the softer protein matrix being worn or broken away between adjacent granules.

In the case of hard wheat flour particles illustrated in FIGURE 2, the nature of the protein material is much harder and the starch granules are more thoroughly imbedded and covered by the homogeneous protein matrix with the result that the general edges of the various particles or endosperm cell fragments are not scalloped by protruding of starch granules but are defined by more and rather sharp regular edges constituting principal portions of the protein mass or matrix.

Our microscope studies (with magnification up to 300 times) showed us that, in general, cereal flours are composed largely of three distinct types of discrete particles, to wit:

(1) The largest discrete particles (see FIGS. 1, 2, 6 and 7) are chunks or fragments of endosperm cells or, frequently, whole endosperm cells or a large particle made up of two, side-by-side endosperm cells. (In the ordinary milling processes, largely roller milling, a single endosperm cell will disintegrate often into a very large number of different discrete particles.)

These endosperm chunks, just like whole endosperm cells, contain the major constituents of flour, namely: starch granules, water-soluble carbohydrates, protein matter forming a matrix around the starch granules and some lipoids disposed in this protein matter while others closely surround the starch surfaces. This endosperm also contains enzymes somehow along with the protein matter, also vitamins, and minerals, while the exact location of these constituencies are not very well understood. Another substance existing in endosperm is the cellulose endosperm cell wall substance.

(2) A great number of free or discrete starch granules varying substantially in size and generally of ellipsoid form are present in cereal flour stocks as may be apparent from study of FIGS. 1, 2 and 6 to 13, inclusive, and these discrete starch granules in the milling process and subdividing of the relatively large endosperm cells often become loosened from the protein matrix wherein they were originally imbedded. Frequently, small remnants of the protein matrix still will adhere to the surface of the free, discrete starch granules. Thus, they are not completely free of protein. Our illustrations show the existence of these adhering, micron protein substances.

(3) In all milled, cereal flour stocks, there are a great number of discrete, very small particles running by maximum linear measurement from two microns up to usually a peak of 24 microns. We have definitely discovered that substantially all of these minute particles, varying greatly in shape and having very irregular configuration with often arcuate recesses defining sides thereof are pure protein. When cutting, shearing or breaking occurs in the process of milling, the lines of adhesion of the protein matrix surrounding the starch granules are more usually broken than are the starch granules themselves so that, oftentimes, these small protein particles break off in the place and shape of the intervening protein matter between the granules as they were in the original endosperm cell.

Frequently small (2 to 8 microns) size starch granules get imbedded and arrested in the larger (15 to 25 microns) protein fragment particles. Thus, the demarcation line between the three groups of flour particles is not sharp, but, on the other hand, is rather gradual but still exists. That is the reason why we show, for accomplishments, protein or starch concentration only and not purely separation.

The foregoing references to microscopic examinations and morphology of cereal particles beginning in column 8 with our surprising discovery of discrete protein-matter particles from novel processes of air separation are fully pointed out and explained in the exhaustive report of C. G. Harrel identified in the reports of Pillsbury Mills, Inc., our assignee, as 11–69 and entitled "Fundamental Research on Flours Produced by Grinding and Fractionation."

The first classification of "chunks" or whole endosperm cells much more frequently occurs in hard wheats than in soft wheats. The largest starch granules found in cereal flour stocks range from 35 to 45 microns in major diameters which, we find, are centrifugally separated out by our critical vortex air separation at any cut below 52 F–D units. Endosperm chunks in which starch granules and protein matrix occur in the same proportion as they do in the parent wheat endosperm in hard wheat seldom are less than 50 microns in lineal average dimensions and average 80 microns. Consequently, these will all stay in the coarse fraction of a 66 F–D critical-cut separation. Generally speaking, the neutral critical-cut of a flour is the index of what is the smallest size of endosperm chunk in which starch granules and protein matrix occur in the same proportion as they do in the parent wheat endosperm.

The chart of FIGURE 3 of the drawings points out results and proofs obtained from careful sedimentation tests carried out under the said Whitby methods of centrifugal sedimentation and with the Whitby sedimentation apparatus upon a sample obtained from the fine (maximum) protein fraction of a soft wheat flour stock, air-separated through the use of our novel methods at a critical-cut of 21 F–D units.

The lower portion of a Whitby sedimentation tube T is illustrated at the left in the chart on a greatly enlarged scale, having the diminished lower end thereof graduated upwardly from the bottom into millimeters. A portion of the said sample was sedimented in accordance with the F–D method and tables and millimeter readings on the basis of settlement time for discrete particles approximating 20 F–D units, 10, 5 and 2 F–D units were considered exemplary and critical. Our object was to remove particles from the sedimentation chamber at the respective strata wherein, by our calculations of fluid-dynamic standards, such values were present and to thereafter intensively observe and consider, under high magnification by microscope, the particles of each stratum. The applicant, Ralph Gracza, kept a careful notebook, tabulating all the results and findings and the results pointed out in FIGURE 3 are actually taken from said notebook.

First, after sedimentation, the lower chamber of the Whitby sedimentation tube T was carefully filled and then broken on the proper graduation (between 10 and 11 millimeters) to obtain a stratum of fine particles of our 2 F–D unit elaluation. Some of said particles from such stratum were removed by a fine instrument and carefully spread over a slide. The ocular of the microscope was supplied with a measuring scale enabling the observer to read in linear microns and square microns on the slide.

Similarly, the lower chamber of the tube was carefully filed and broken at the readings shown in the left on our chart and small portions of the stratum at the breaks removed for particles of 5F–D units, 10 and 20 F–D unit evaluations, in each instance, the removed particles being carefully spread upon a separate slide as in the first instance. The respective slides, with the spread particles thereon, were intensively observed and frequently certain particles turned by us under a microscope having a magnification of 380 times actual size. Thereafter, the applicant Gracza from his observation of each slide under such magnification, drew in his notebook, to the best of his ability, enlargements of several actual particles for each stratum.

At the right-hand side of the chart, in great magnification (see the scale) of 1 to 1300, a typical protein particle and a typical starch particle for each of said stratas at the previously stated F–D unit evaluations have been reproduced.

The significance of the illustration is that the protein and starch particles side-by-side have identical flow-dynamic characteristics, i.e. common settling time. Generally a 6½ micron average diameter ellipsoid starch granule with its 1.48 density behaves like the 13 micron long irregularly shaped 1.32 density protein-matter particle. Generally, the 9 micron starch behaves like the 18 micron protein; the 10 micron starch is similar in behavior to the 22 micron protein-matter particle. Generally, a critical-cut by flow-dynamic separation will treat protein matter twice the size of starch granules alike and grade them together into the same fraction of a separation. As explained beforehand, the total weight of the less than 14 micron size starch granule is a very small portion of the flour stock and still a separation at that critical-cut is able to concentrate protein-matter particles up to 28 microns into the same fine fraction and that means all of the free, discrete protein and protein-matter concentrated particles available in the flour. This is a well-grounded explanation, accounting for the high protein concentration by us through low critical-cut air separations.

More specifically, the difference in shape between protein-matter particles and starch granules having the same flow-dynamic property (i.e. common resistance based on common settling time) can be approached with numerical values called herein "relative shape factors." These factors express how many times larger are the protein-matter particles than the starch granules having both the same flow-dynamic properties using in their expression procedure facilities made available by microscopic technique.

In Appendix C, attached to this specification, is a tabulation which should be referred to in conjunction with FIG. 19, presenting relative shape factor data based on careful selection of 40 particles.

EXAMPLES

We will now give some examples of some of the practical uses of our processes. Hereinafter the ash, protein, moisture, fat, diastatic activity (maltose) and mold spore tests were all run according to standard methods as set forth in "Cereal Laboratory Methods," fifth edition, 1947. The protein and ash figures hereinafter quoted were thereafter adjusted to a uniform 14% moisture basis. The cake and bread baking tests hereinafter quoted were carried out under standardized baking tests and the results tabulated in accordance with the previously identified authority, i.e. "Cereal Laboratory Methods," fifth edition, 1947. There hereinafter quoted Fisher values were arrived at in accordance with the standardized method described in the publication of B. Dubrow, "Analytical Chemistry," volume 25, 1953, pp. 1242 to 1244. "Fisher Scientific Co. (Pittsburgh, Pa.) Directions for Determination of Average Particle Diameters, etc."

*Example 1.*—Single-stage air separation of a parent hard wheat patent flour, commercially milled out of a blend of 50% hard spring wheat and 50% hard winter wheat containing 10.3% protein and 0.408% ash, and with a Fisher SSS value of 19.25.

The critical-cut of this separation was at approximately 22.5 F–D.

10% of the flour was obtained by such air separation as a fine particle-size fraction having a high, 20.6% protein and having 0.711% ash with a Fisher value of 4.0. The remaining 90% coarse fraction of the flour contained 9.6% protein, 0.370% ash with a Fisher value of 20.4. The fine fraction is a high protein (commercially known as high gluten) flour, well suited for blending purposes in order to make premium bakery flours. The coarse fraction is a good family flour (for all purpose use).

In commercial milling, it is accepted practice to produce flour grades which are called "patent" flour, having rigid ash specifications (.45% ash or less depending on whether the flour is a "short" or "long patent" flour). Patent flour usually comprises a blend of from twenty to forty millstreams in which the ash content of the individual streams ranges from 0.32% to 0.50% ash. When these streams are blended, the ash content is averaged in the resultant blend and may approximate .40% ash as in the case of the parent flour of Example 1. The other millstreams (from eight to fifteen), characterized by a relatively high ash content are not utilized in the manufacture of patent flour.

Example 1 (supra) shows removal through our processes from parent flour stock containing .408% ash of a 10% fine fraction having a high ash content of the remaining patent flour portion to .37% ash (90% of parent stock). This ash depletion has made possible the use for production of patent flour of a number of said millstreams which previously were not used because of accepted ash specifications and which before our fractionation, contained more than .50% ash. Again, pointing to Example 1, we have found that on the basis of removal of 10% of the parent stock therein, having an ash content approximating .711% ash, we can utilize several additional higher ash millstreams to bolster the patent flour recovery. We have found that several commercial millstreams ranging between .50% and .60% ash can be included with the parent stock of Example 1 before processing and with our process, as carried out in said Example 1, result in a coarse fraction of the blend approximating .40% ash. Approximately 20% additional flour stock by weight from the .50% to .60% ash streams can be utilized with the streams which make up the parent patent stock in Example 1 and when fractionated as set forth, will give a notable net gain in the patent flour percentage in this example.

With further reference to the advantage of our novel processes in enhancing patent flour recovery, we have in actual use blended the ash depleted fractions of high-ash-content streams such as the fourth break flour, the first tailings and the seventh and eighth middlings flour with the previously recognized twenty to forty, commercial, "patent" flour streams. In doing this, the blend of the commercial high ash content streams with sometimes two or three streams of the higher ash "patent" stock, are usually first subjected to a critical cut or cuts within the ranges of from 15 to 25 F–D, thereby separating out a fine fraction, usually constituting 3% to 8% of the said additional streams and having high ash content ranging from 0.9% to 1.5%. This leaves the larger fraction (from 92% to 97%) of the commercial higher ash content streams depleted of ash sufficiently for inclusion in commercial "patent" flour output, and said larger fraction may be merely added to the selected commercial patent flour streams to produce a resultant blend having the desired ash content between 0.40% and 0.44%.

*Example 2.*—The production of two valuable flour fractions by two-stage air separations from a commercially milled hard wheat patent flour out of straight Nebraska winter wheat. The protein content was 10.08%, ash 0.371%, with a Fisher value of 18.2. The first-stage air separation was made at approximately 25 F–D with 15% by weight, fine-particle fraction less than 25 F–D and an 85% coarse fraction.

The first-stage fine fraction contained 18% protein, 0.745% ash, with a Fisher value of 4.4. The first-stage coarse fraction contained 8.5% protein, 0.322% ash, with a Fisher value of 19.5.

We then made a second-stage air separation on the said 85% coarse fraction at a critical-cut of approximately 64 F–D, and thereby divided the 85%, first-stage coarse fraction into a 33% second-stage fine fraction of from 25 to 64 F–D particles, and into a 52% second-stage coarse fraction containing the particles above 64 F–D (said last percentages being related to the total weight of the original or parent flour stock).

The second-stage fine fraction contained 6.41% protein, and 0.344% ash, with a Fisher value of 13.75. It should be noted there that the protein was far below the level of the protein of the original parent stock. The second stage coarse fraction had a protein of 9.72% and an ash of 0.307%, with a Fisher value of 25.1.

We then blended the first-stage fine fraction with the second-stage coarse fraction in the natural proportions enumerated (15% + 52% = 67%) for the production of an excellent bread flour having higher protein content than the parent flour stock, to wit: 12.4% protein, 0.420% ash, with a Fisher value of 14.6. This blend, by test, baked a better bread than the original parent flour.

The second-stage fine fraction (33%) which was no part of the aforementioned blend is usable, for instance, as a blended part of a southern soft wheat family or all-purpose flour, mainly utilized in biscuits and cakes.

For ready correlation of description, protein, ash and Fisher, with cake volumes and bread volumes, the following table is reproduced from the results made in the previously described example.

2.—Example

| Description | Prot. | Ash | Fisher | Cake 115% sugar, cc. | Volume 140% sugar, cc. | Bread vol., cc. |
|---|---|---|---|---|---|---|
| Parent flour XT-4923 | 10.08 | 0.361 | 18.2 | 1,908 | 1,955 | 655 |
| 1st-stage coarse plus 25 F-D XT-4941 | 8.50 | 0.322 | 19.5 | 1,892 | 2,003 | 630 |
| 1st-stage fine minus 25 F-D XT-4942 | 18.00 | 0.745 | 4.4 | 2,208 | 2,145 | 705 |
| 2nd-stage coarse plus 64 F-D XT-4953 | 9.72 | 0.307 | 25.1 | | | 585 |
| 2nd-stage fine plus 25-64 F-D XT-4954 | 6.41 | 0.344 | 13.75 | | | 545 |
| Remix, XT-4960 (XT-4953-52% and XT-4942-15%) | 12.4 | 0.420 | 14.6 | | | 70 |

*Example 3.*—In this example, a two-stage air separation was made with the identical parent stock of material specified in Example 2. The first-stage air separation was carried out identical to the first-stage separation of Example 2 resulting in the previously noted protein, ash and Fisher valuations on the 15% first-stage fine fraction and the 85% first-stage coarse fraction.

Then, in this example, a second-stage of air separation was made on the first-stage coarse fraction at a critical-cut approximating 53 F-D, dividing said 85% first-stage coarse fraction into a 22% second-stage fine fraction (comprising particles between 25 and 53 F-D) and into a 63% second-stage coarse fraction containing the particles above 53 F-D.

The second-stage fine fraction contained 7.24% protein, 0.377% ash, with a Fisher value of 11.55. The second-stage coarse fraction had a protein content of 9.16%, ash 0.312%, with a Fisher value of 22.9.

We then blended the first-stage fine fraction (15%) with the second-stage coarse fraction (63%) producing a bread flour (78% of the original stock) with a higher protein content than the parent flour stock, to wit: a protein of 11.2%. This blended bread flour had an ash of 0.390%, with a Fisher value of 14.46.

The remaining portion, to wit: the second-stage fine fraction (22% by weight of the original stock) produced a good cake flour.

To facilitate correlation of the protein and ash content of the new fractions obtained in Example 3, as related to cake volume, the following tabulation is made of our results with reference to the second-stage coarse fraction and second-stage fine fraction and the blend of the first-stage fine with the second-stage coarse.

3.—Example

| Description | Prot. | Ash | Fisher | Cake 140% sugar, cc. | Volume 115% sugar, cc. |
|---|---|---|---|---|---|
| 2d-stage coarse plus 53 F-D XT-4951 | 9.16 | 0.312 | 22.9 | 1,924 | 1,798 |
| 2d-stage fine plus 25-53 F-D XT-4952 | 7.24 | 0.377 | 11.55 | 2,208 | 2,302 |
| Remix, XT-4959 (XT-4951-63% and XT-4942-15%) | 11.2 | 0.390 | 14.46 | 2,050 | 2,176 |

*Example 4.*—Controlling cookie spread factor of wheat flours by producing a coarser fraction flour through our novel air separation process. Within the range of our discovered critical-cuts, air separation has been found to lower the protein, make coarser the granulation and apparently remove most of the cell wall matter generally considered to be responsible for poor cookie spread.

In this example, a parent soft wheat flour with a protein content of 7.7%, an ash of 0.304%, and having a Fisher value of 12.25, was utilized, said flour having a cookie spread of 4.0″ and an all-over quality evaluation score of 95½.

We made a critical-air separation on this parent stock at a critical-cut of approximately 25 F-D resulting in a 19% fine fraction (by weight) and an 81% coarse fraction.

The fine fraction contained 19.8% protein and 0.382% ash, with a Fisher value of 4.55.

The coarse fraction (81%) contained 5.7% protein, 0.287% ash, with a Fisher value of 14.95. This coarser fraction was baked into cookies and the cookie spread was found to be 4 5/16″. The overall baking quality score for the same was above 100, which score of the Quality Control Laboratories of Pillsbury Mills has been our standard of perfection.

We also report here that baking tests for control of cookie spread were made on hard wheat flours in the same manner with improvement by our air separation process on the coarse fraction for use in cookie baking. Recitation of such example is thought unnecessary in view of the similar results obtained and the fact that hard wheat flour stocks are not utilized or desired today in the production of cookie flour.

For reference concerning cookie baking and judging methods, we refer you to the article entitled "Cookie Flour Studies I", "Analysis by Means of the Cookie Test" by G. F. Garnatz, W. H. Hanson and R. F. Lakamp, published in "Cereal Chemistry," volume XXX, pp. 541–549, 1953.

*Example 5.*—Improvement of the baking quality of hard wheat flours by the addition of high protein, fine fraction of soft wheat flours (XT-5727 and XT-5722).

A blend of low protein hard wheat family flour (which is not able to produce breads of large volumes alone because it is lacking in baking strength) and a fine air separated fraction from soft wheat cake flour will produce breads with large volumes than a hard wheat flour with the same protein content as such a blend.

The hard wheat family flour in this instance contained 10.5 protein, 0.402 ash, and was milled out of a mix of 35% Hard Spring wheat and 65% Hard Winter wheat. The fine fraction flour in this instance was a by-product from commercial cake flour obtained through the commercial application of our novel air separation process at critical cuts between 20 and 25 F-D. We show the specifications of such high protein fine fraction flours in the table below together with the making results from flours blended out of the hard wheat family flour with said fine fraction flours.

| | Percent of fine fraction flour in blend | Percent of family flour in blend | Loaf volume of blend cc. |
|---|---|---|---|
| The family flour | 0 | 100 | 730 |
| Soft wheat fine fraction: | | | |
| Protein, 18.61% | 10 | 90 | 735 |
| Ash, 0.45% | 25 | 75 | 780 |
| Fisher, 4.7 | 50 | 50 | 810 |
| Extraction, 5.0% | 75 | 25 | 845 |
| | 100 | 0 | 890 |
| Soft wheat fine fraction: | | | |
| Protein, 22.16% | 10 | 90 | 760 |
| Ash, 0.44% | 25 | 75 | 815 |
| Fisher, 3.85 | 50 | 50 | 865 |
| Extraction, 9.0% | 75 | 25 | 900 |
| | 100 | 0 | 960 |

The said fine fraction (high protein product) was blended variously with coarse grain flours such as graham and whole wheat and baking tests were made thereon. Also, the same high protein, soft wheat fraction of our invention was blended in various proportions with conventional blends of rye and clear hard wheat flours and we made baking tests to determine baked loaf volume, texture and dough handling properties. We found that the addition of said high protein, soft wheat fraction substantially improved in all instances above recited, the loaf volume, the texture of the loaf and the dough-handling properties as contrasted with the coarse grain flour per se in conventional rye and clear hard wheat flour wherein such tests were made.

*Example 6.*—The production of a better angle food cake flour out of the coarse fraction separated from soft wheat cake flour. In this example, we further show the removal of relatively high mold spore made from the parent flour stock and purposely used a parent soft wheat stock having a relatively high mold spore count.

The critical-cut was made in this instance at 16 F–D resulting in an 11.5% fine fraction and an 8.5% coarse fraction. The objective in this case was the depletion of the protein and mold spore in the coarse fraction and in the production of a high protein level in the fine fraction. We tabulate below the results of this example.

| Measurement | Parent flour | Coarse fraction | Fine fraction |
| --- | --- | --- | --- |
| Fisher value | 11.8 | 13.0 | 3.48 |
| Protein, percent | 8.0 | 6.0 | 21.5 |
| Ash, percent | 0.32 | 0.31 | 0.40 |
| Maltose value (a) | 150.0 | 140.0 | 230.0 |
| Fat (b) | 0.80 | 0.67 | 2.0 |
| Mold spores (b), per g | 1,000–2,500 | 220–900 | 5,960–7,700 |
| Volume white cake, cc | 1,065 | 1,090 | 920 |
| Volume angel food, cc | 3,605 | 3,800 | 2,525 |

The significant results from the foregoing are the depletion of lipoids (fats) as well as proteins and ash from the parent stock and into the fine fraction. The foregoing table definitely shows the concentration of the large proportion of the damaged starch and enzymes in the fine fraction as indicated by the maltose value shown. Our critical air separations furthermore concentrated the mold spores in the fine fraction, thereby depleting the mold spore content of the coarse fraction which materially enhanced the coarse fraction for prepared mixes. The depletion of lipoids and fats from the coarse fraction greatly enhances the value thereof as an angle food cake flour and as a portion of prepared cake mixes because the shelf life of the air-separated coarse fraction is very materially increased by such depletions (both mold spore and fat content).

*Example 7.*—Improvement of rye flour by depletion of protein, ash, damaged starch and fat from the parent stock.

The parent stock was a commercially milled white rye flour with a protein content of 8.45%, ash content of 0.716% and having a Fisher value of 10.25, and a color reflectance value of 36.1 Hunter color over the Color Difference Meter instrument, Rd measurements.

We employed an efficient air separation at 19.5 F–D critical-cut, producing an 8% fine fraction and a 92% coarse fraction.

The fine fraction contained 17.6% protein, 1.15% ash with a 4.2 Fisher value, and 37.1 Rd reflectance by Hunter color difference meter.

The coarse fraction had 7.7% protein, 0.714% ash, with a Fisher value of 11.7, and with 33.9 Rd reflectance by Hunter color difference meter.

Note: The color reflectance was established by the system of color reflectance measurements of Pillsbury Mills, Inc., which system and methods are comparable to standard accepted methods as set forth in the publication "Cereal Chemistry", volume XXXI, pp. 73 to 86 (1954), in an article entitled "Evaluating Semolina Color with Photo-electric Reflecto-Meter" by F. A. Matz and R. A. Larson.

The Amylograph dough testing of the three flours (including the parent stock) utilizing 90 gr. of flour and 450 cc. of water, showed the following:

|  | Peak in B.U. |
| --- | --- |
| Parent stock | 965 |
| Fine fraction | 530 |
| Coarse fraction | 980 |

Rye baking quality, as recognized, is generally associated with high Amylograph peak B.U. values. The removal of the 8% fine fraction which had a low B.U. value has appreciably increased the high B.U. value of the coarse fraction.

*Example 8.*—Enhancing the bread baking qualities of a mediocre hard wheat bakery flour.

We produced flour fractions by two-stage, critical-cut air separations from a commercially milled, hard wheat patent flour consisting of a blend of 55% Oklahoma hard winter wheat, 30% North Kansas hard winter wheat, and 15% Montana hard spring wheat. The blend or parent stock had a protein content of 11.45%, ash of 0.407%, with a Fisher value of 20.7.

We made a first-stage air separation at approximately 34 F–D critical-cut resulting in a fine fraction of 10% by weight and a coarse fraction of 90%. The first-stage fine fraction (below 34 F–D size) contained 18.8% protein, 0.620% ash, with a Fisher value of 5.05. The first-stage coarse fraction had a protein content of 11.05%, ash of 0.389%, and a Fisher value of 22.5.

We made a second-stage air separation upon the coarse fraction (90%) at a critical-cut of approximately 72 F–D thereby dividing said 90% first-stage coarse fraction into a 21.5% second-stage fine fraction (consisting of particles between 34 and 72 F–D) and into a second 68.5% coarse fraction containing the particles larger than 72 F–D.

The second-stage fine fraction contained 9.72% protein, 0.403% ash, with a Fisher value of 12.6, obviously below the protein content of the original parent stock.

The second-stage coarse fraction had a protein of 11.6%, an ash of 0.365%, with a Fisher value of 26.4, the protein being obviously substantially higher than the original parent stock.

After the second critical-cut as enumerated, we blended the fine fraction (high protein) of the first-stage with the coarse fraction of the second-stage air separation in their proportions (10% plus 68.5% equaling 78.5%), thereby producing a bread or bakery flour with higher protein count than the parent flour stock, to wit: a protein percentage of 12.4, and having an ash of 0.403%, with a Fisher value of 19.95. We baked this flour into bread and found that a better bread was produced than from the original parent flour.

The second-stage fine fraction (21.5% of the parent stock, by weight, with protein content of 10.1%) which was no part of said blend was well usable, for example, as a blended part of a southern soft wheat family flour, the main use of which is for biscuits and cakes.

It should be noted that the micro-photographs and illustrations appearing in the drawings of this application as FIGURES 7, 9, 11, 12 and 13 show the particle distribution and characteristics of the original parent flour (FIGURE 7), the air-separated first-stage fine (FIGURE 9), the coarse of the first-stage air separation (FIGURE 11) as well as the second-stage fine and coarse fraction (FIGURES 12 and 13, respectively). The first-stage fine flour shown in FIGURE 9 well illustrates the general small size and the very irregular shapes of the free protein-matter particles. It also illustrates the relatively few numbers of small starch granules in relation to discrete protein-matter particles and the absence of larger starch granules.

The illustration (FIGURE 12) of the second-stage fine fraction of approximately 72 F–D critical-cut shows the preponderance of discrete, normal, average-size starch granules some of which have adhering protein matter thereon in relation to the fine-discrete protein-matter particles as well as to the endosperm chunks consisting of starch granules and the cementing protein matrix.

The illustration (FIGURE 13) of the second-stage coarse fraction is a good example of hard wheat endosperm chunks or chunk flour particles as to general size, shape and morphology. All the pictures referred to well demonstrate the sharpness of separations made possible in the sub-sieve size ranges with our new process of critical-cut air separation.

*Example 9.*—Depletion of protein from soft wheat, short patent flour (with attendant improvement in color by a second-stage critical-cut).

We utilized a commercially milled soft wheat patent flour comprising a blend of 85% Northern Indiana soft wheat, 15% Michigan white wheat having a protein content of 7.7%, ash 0.304%, and with a Fisher value of 12.25, and with a Hunter Rd reflectance value of 64.1 and B yellowness value of +19.8.

We fractionated this soft wheat flour blend by air separation, for depletion of protein at a critical-cut of approximately 30 F–D, thereby producing a fine fraction comprising 32% of the original stock and a coarse fraction comprising 68% of the parent stock. The said fine fraction contained 14.2% protein, 0.351% ash, with a Fisher value of 5.8, and a reflectance value Rd of 63.1 by Hunter color difference meter, and a yellowness of B+19.0.

The coarse fraction from said first-stage air separation had a protein content of only 5.3%, an ash of 0.284%, with a Fisher value of 16.55, and had a reflectance Rd value of 63.8 and yellowness B value of +19.2.

The coarse fraction (68% of the parent stock) as shown in FIGURE 10 of the drawings makes an excellent angel food cake flour. The particle distribution is well illustrated as in the parent stock in FIGURE 6 of the drawings and the fine portion is illustrated in FIGURE 8.

For certain uses to obtain even further depletion of protein and substantial improvement in color, we subjected a portion of the coarse fraction obtained in said previously recited first-stage air separation (at 30 F–D critical-cut) to a second-stage separation at a critical-cut of 41 F–D, thereby dividing the coarse fraction into two second-stage fractions, the finer of which is approximately 40% of the weight of the coarse fraction, and the second-stage coarse fraction being approximately 55% of the first-stage coarse fraction.

The second-stage fine fraction contained only 4.02% protein, and 0.281% ash, with a Fisher value of 14.05, with a reflectance value of 67.4 Rd and a yellowness value of B+17.6, the protein here being far below the level of the original parent stock. The color valuations expressed are significant in showing an enhanced lightness in the second-stage fine fraction and a substantial reduction in yellowness as contrasted with both the parent stock and the previously produced fractions. The protein was far below the level of the original parent stock. The said improved fraction here (second-stage fine) contained particles between 30 and 41 F–D.

The second-stage coarse fraction (larger than 41 F–D) had a protein content of 7.27%, ash 0.292%, with a Fisher value of 18.65, and having a reflectance value Rd of 61.7, and yellowness value B of +20.6.

The illustrations, FIGURES 6, 8 and 10, made from micro-photographs of the parent flour and the first-stage fine and coarse fractions, reveal the comparatively smaller average particle size of soft wheat flour as contrasted with hard wheat flours. These illustrations also show the characteristic rounded or scalloped edges on the chunks or agglomerates of soft wheat particles as distinguished from the usually larger endosperm chunks of hard wheat defined by angulated, generally straight or angled edges without much overlapping of starch granules beyond the exterior edges of the protein matrix.

*Example 10.*—Up-grading the desirable qualities of corn flour.

(a) We obtained commercially produced yellow corn grits and, by commercial process, reduced it to flour fineness, said flour having a protein of 7.82%, an ash of 0.306%, a maltose value of 114, and a fat content of 1.15%, with acidulated viscosity of 7 MacMichael degrees and with color readings on the Hunter color difference meter for reflectance of Rd 44.4 and a yellowness of B equals +40.1 and with Fisher value of 21.7.

We have performed an efficient air separation at approximately a 34 F–D critical-cut, thereby producing a 3% fine fraction and a 97% coarse fraction. This small fine fraction extracted, depleted the coarse fraction of protein, ash, maltose value and fat content containing, by our tests, 9% protein, 1.001% ash, 600 maltose value, 3.70% fat content, acidulated viscosity 70 MacM. degrees and color readings: reflectance Rd 47.6, and yellowness B equals +35.2, and having a Fisher value of 6.15.

The coarse fraction from the same separation contained 7.65% protein, 0.29% ash, a maltose value of 150, fat content of 0.90%, acidulated viscosity 5 MacM. degrees, color readings: reflectance Rd 42.7, and yellowness B equals +39.4, and having a Fisher value of 24.6.

We feel that all differences are significant but especially the reduction of fat content in the coarse fraction since this plays a very important part in commercial corn flour specifications and substantially adds to the storage life of the product.

(b) With the same parent stock, we performed another and different efficient air separation at approximately 54 F–D critical-cut, producing a fine fraction of 15% of the parent sample, by weight, and a coarse fraction of 85%.

The fine fraction contained 6.1% protein, 0.586% ash, a maltose value of 381, fat content 2.10%, and had an acidulated viscosity of 34 MacM. degrees, and color readings: reflectance Rd 50.0 and yellowness B equals +36.1, and with a Fisher value of 9.6.

The coarse fraction from said 54 F–D critical-cut contained 8.04% protein, 0.240% ash, a maltose value of 249, a fat content of 1.07%, with acidulated viscosity of 4 MacM. degrees, and with color readings: reflectance Rd 42.0, and yellowness B equals +40.3, and having a Fisher value of 29.9.

*Example 11.*—Production of low protein, starchy fraction by multiple stage, critical air separation.

We produced novel flour fractions of substantial importance with significant admixture or blending of certain of said fractions through a six-stage air separation embodying our invention. In this example, we started with a commercially milled, soft wheat, short patent flour comprising a blend of 85% northern Indiana soft red wheat and 15% Michigan soft white wheat, said blend having a protein content of 7.7%, ash of 0.366% and a Fisher value of 11.7%.

A first-stage, efficient air separation was made upon the parent stock at 19 F–D's and thereafter, a second-stage air separation was made upon the coarse fraction from the first stage at 22 F–D. Thereafter, we made a third-stage air separation upon the second stage coarse (over 22 F–D's) at a critical cut of 29 F–D. The fine fractions from said three air separations (at 19, 22 and 29 F–D's) removed 28% by weight of the flour from the parent stock (smaller than 29 F–D). These first stage, second stage and third stage fines were blended together and contained protein of 16.4% and ash 0.465%.

The coarse fraction of the said third stage air separation represented 72% of the original parent flour stock and contained 5.3% protein, 0.362% ash with a Fisher value of 16.5. We next subjected said 72%, third stage coarse fraction to an efficient fourth stage air separation at approximately 41 F–D critical cut, thereby producing a 13%, fourth stage fine fraction, consisting of particles in the 29 to 41 F–D range and a second fraction comprising 59% of the parent stock (fourth stage coarse) comprising the larger than 41 F–D flour particles. The fourth stage fine fraction contained a heretofore unexpectedly low 3.6% protein and an ash of 0.308 with a Fisher value of 13.65. The coarse fraction of the fourth stage cut had a protein of 5.55%, an ash of 0.342% with a Fisher value of 17.2%.

We next subjected the 59%, fourth stage coarse fraction to a fifth stage air separation at approximately 48 F–D critical cut, thereby dividing the same into a 19%, fifth stage fine fraction (in the 41 to 48 F–D range) and into a 40%, fifth stage coarse fraction comprising the larger than 48 F–D particles.

The fifth stage fine fraction contained a very low, 3.15% protein and an ash of 0.321% and had a Fisher value of 15.2%. The fifth stage coarse fraction had a protein content of 6.56%, an ash of 0.377% and a Fisher value of 18.7%.

We next subjected the fifth stage coarse fraction (40% of the original stock) to a 6th stage air separation at approximately 58 F–D critical cut, thereby producing an 11% (by weight), 6th stage fine fraction (consisting of particles in the 48 to 58 F–D range) and simultaneously producing a 29%, sixth stage coarse fraction (comprising particles larger than 58 F–D).

The sixth stage fine fraction contained a very low 3.67% protein content and an ash of 0.353% and had a Fisher value of 15.4%. The sixth stage coarse fraction had 7.9% protein, an ash of 0.408 and a Fisher value of 19.4.

The very low protein flour fractions (the fines) from the fourth, fifth and sixth stage air separation represent 43% of the original parent flour stock. This large portion of a commercially produced soft wheat flour through practice of our novel process became substantially depleted of its natural protein content. It is to be understood that said three low protein fractions may be blended together for significant commercial advantage or the fractions may be individually utilized for blending with other commercially produced flours.

This process has great commercial advantages, especially in years when the harvest of soft red winter wheat crop turns out with abnormally high protein content. The artificially protein depleted flours could be baked straight or blended with other commercially produced soft wheat flours to produce superior cookies, angel food cakes, pie crusts, pastries of all kinds, etc. Such goods are preferred if baked from low protein flours.

After the 43% low protein fine flour fractions are removed of the original parent flour stock by air separation, the remaining fractions, namely, first, second and third stage fine fractions and the sixth stage coarse fraction representing 57% of the original parent flour were blended together and had a 12.38% protein content, and an ash content of 0.455%. Everyone familiar with the flour trade would recognize a wheat flour with a 12.38% protein and a 0.455% ash content as the most commonly used baker's grade of long patent flour. Our baking tests have proved that flour obtained by the described process and example from soft wheat flour after proper maturing treatment will bake in every respect equal to flour with similar specifications milled from high protein hard wheat of the same specifications.

*Example 12.*—Improvement in bread baking qualities of a mediocre hard wheat flour blend and production of two flour fractions by two-stage, air separation embodying our inventions.

A commercially milled hard wheat patent flour comprising a blend of 55% Oklahoma hard winter wheat, 30% North Kansas hard winter wheat, and 15% Montana hard spring wheat was employed as the parent stock. This flour blend had a protein content of 11.45%, ash 0.407%, with a Fisher value of 20.7.

The parent flour was subjected to a first-stage efficient air separation at a critical-cut of approximately 70 F–D which resulted in a fractionation with 30% of the flour in the fine and 70% in the coarse fraction. The first-stage fine fraction contained 10.65% protein, 0.505% ash, with a Fisher value of 11.3. The first-stage coarse fraction contained 11.75% protein, 0.363% ash, and a Fisher value of 28.9.

Note: This original or first air separation cut was above the "neutral critical-cut" ranges discovered by us and disclosed in preceding column 5, accounting for the fact that the first-stage coarse fraction had 11.75% protein, somewhat greater than the parent flour stock.

The first-stage fine fraction (30% by weight of the original flour) was then subjected to efficient air separation at a critical-cut of approximately 29 F–D producing a second-stage fine fraction of 8.5% by weight of the parent flour stock (containing the particles smaller than 29 F–D size) and into a second-stage coarse fraction representing 21.5% of the original flour and containing particles between the 70 and 29 F–D size.

The second-stage fine fraction (8.5% of original stock) contained 17.8% protein, 0.623% ash, with a Fisher value of 4.95, the protein being substantially higher than the original flour stock. The second-stage coarse fraction (21.5% of original stock) contained 8.9% protein, 0.444% ash, with a Fisher value of 15.15.

The first-stage coarse fraction was then blended with the second-stage fine fraction for protein concentration in their natural proportions (70% plus 8.5% equaling 78.5%). The said blend had higher protein content than the parent flour stock, to wit: 12.2%, and had an ash of 0.397%, with a Fisher value of 22.4.

Several loaves of bread were baked from the parent stock and from the last mentioned higher protein blend and physical dough testing data of the respective flours and bread as characteristic indexes for the strength of the respective flours are presented below.

| Description | Valorimeter | Extensograph area on relaxation time of 1 hour | Absorption | Peak time Farinograph | Amylograph using 65 gr. flour and 460 cc. water B.U. | Extensibility/resistance based on relaxation of 1 hour |
| --- | --- | --- | --- | --- | --- | --- |
| Parent flour | 62 | 78 | 59.5 | 6.0 | 550 | 202/160=1.26 |
| First-stage, coarse fraction | 65 | 83 | 59.7 | 6.5 | 675 | 141/315=0.45 |
| First-stage, fine fraction | | | | | 505 | 140/165=0.85 |
| Second-stage, coarse fraction | 44 | 45 | 58.1 | 1.5 | 170 | 205/155=1.32 |
| Second-stage, fine fraction | 80 | 74 | 80.3 | 11.0 | | |
| Remix of first-stage coarse fraction and second-stage fine fraction | 68 | 90 | 61.0 | 7.25 | 570 | 182/220=0.82 |

Physical dough testing data supports the contention in the example that the removal of the second-stage coarse fraction increases the potential baking value of the other remixed fractions. Valorimeter increased from 62 to 68, Extensogram area 78 to 90, absorption 59.5 to 61.0, Farinograph peak time 6.0 to 7.25, Amylograph 550 to 570 B.U. Extensibility/resistance ratio shows the oxidation effect of air separation processes.

*Example 13.*—Fractionation of soft wheat patent flour-particle distribution illustrated in FIGURES 16 to 18 of the drawings.

We subjected a commercially milled soft wheat, patent flour comprising a blend of 85% Northern Indiana soft red wheat and 15% Michigan white wheat to a single-stage air separation at approximately a 20 F–D critical-cut. The parent flour had a protein content of 7.83%, ash 0.326%, and a fat or lipoid value of 1.04%.

A critical-cut at approximately 20 F–D produced a fine fraction comprising 12% by weight of the original flour and a coarse fraction of 88% of the original flour.

The fine fraction contained 20.52% protein, 0.360% ash, and a fat of 2.04%. The coarse fraction contained only 5.76% protein, 0.315% ash, and only 0.57% fat. Physical dough tests were made on the parent flour and on both of its said fractions. We present below the results of said tests, showing characteristic indexes for the strength of the respective flours.

| Description | Valorimeter | Extensograph area on relaxation time of 1 hour | Absorption | Peak time Farinograph | Amylograph using 65 gr. flour and 460 cc. water B.U. | Extensibility/resistance based on relaxation of 1 hour |
|---|---|---|---|---|---|---|
| Parent flour | 41 | 52.5 | 49.7 | 1.0 | 700 | 80/520=0.154 |
| Coarse fraction | 32 | 30.5 | 49.1 | 0.5 | 745 | 63/400=0.158 |
| Fine fraction | 96 | 135.5 | 82.9 | 21.0 | 455 | 124/700=0.177 |

Physical dough testing data supports the contention of the example that the removal of the high protein fine fraction with great bread baking strength will reduce the strength of the remaining coarse fraction which is very desirable for a good cake flour. Valorimeter values reduced from 41 to 32, Extensogram area from 52.5 to 30.5, Farinograph peak time 1 to 0.5, Amylograph 700 to 745. The fine fraction displays extraordinary baking strength with 96 Valorimeter value, 135.5 Extensograph area, 82.9% absorption and 21.0 minute Farinograph peak time.

*Example 14.*—Production of two premium flour products from a single air separation of milled soft wheat flour.

In this example, we utilized a commercially milled (bleach) soft wheat, short patent flour comprising a blend of 85% Northern Indiana soft red wheat and 15% Michigan white wheat. This blend had a protein content of 8.05%, ash 0.303%, with a Fisher value of 11.4.

We subjected this flour to efficient air separation at a critical-cut of approximately 16½ F–D resulting in the production of a 6% fine fraction and a 94% coarse fraction.

The fine fraction (particles less than 16 F–D size) contained 23.7% protein, 0.429% ash, with a Fisher value of 3.68.

The coarse fraction contained only 7.6% protein, 0.307% ash, with a Fisher value of 11.7 and, upon tests, showed that this coarse fraction was well adapted for a protein-depleted improved cake flour. The fine fraction with the 23.7% protein constitutes a very valuable premium product or protein concentrate which is capable of many uses including blending of the weaker hard wheat or soft wheat flours to produce high grade bakery flours.

From the foregoing disclosure and the several examples set forth, it will be seen that our inventions may be utilized to obtain, through dry fractionation and critical air separation, numerous valuable new results including the following:

(1) Withdrawal from milled cereal flours of substantially all discrete, protein matter particles.

(2) Production from milled cereal flours of a fraction of heretofore unattainable, high protein concentration constituting a premium product for the subsequent blending with or the upgrading of flours for baking purposes.

(3) Production from milled cereal flours of a fraction having a relatively high concentration of starch.

(4) Production commercially from milled cereal flours of fractions which have very low, protein content and which are adapted for sale as premium, cake-type flours for making cookies, cakes, pancakes and other products made from batters.

(5) Commercial production from milled cereal flours, selectively, of fractions which vary in protein content from approximately 4% to approximately 26%.

(6) Removal from milled cereal flours of a fraction having high concentration of substances producing ash.

(7) Removal from milled cereal flours of a fraction having a high concentration of lipoids.

(8) Removal from milled cereal flours of a fraction wherein the enzymes are concentrated.

(9) Removal from milled cereal flours of a fraction wherein damaged starch (the very fine or immature starch granules and broken starch granules) are concentrated.

(10) Production commercially of a large percentage, cereal flour fraction having improvement in color (higher light reflectance).

(11) Removal from milled cereal flours of a major proportion of microorganisms such as mold spores.

(12) Changing the physical dough characteristics and increasing or decreasing the baking strength as desirable for certain flour purposes, said "characteristics" including among others (*a*) absorption, (*b*) mixing tolerance, (*c*) valorimeter value, (*d*) amylograph peak, and (*e*) extensograph area.

(13) Increasing the possible patent flour percentage of commercial flour stocks through withdrawal of high ash contributing substances as well as other deleterious matter.

(14) Utilization of protein concentration steps as previously set forth in paragraph (2) with subsequent blending of the high protein fraction with lower protein wheat flours (and consequently lower priced flours) to produce standard, protein flour grades. This advantage is applicable to the higher, protein soft wheat flours and the lower protein, hard wheat flours which are commercially available.

(15) Blending or addition of our new high protein concentration fraction with wheat flour mixes or blends recognized by the trade as mediocre quality as to protein and dough characteristics to thereby upgrade such mixes into standard and acceptable, quality flours.

(16) Addition of our new high starch concentration fractions as previously set forth in paragraph (3) with wheat flour mixes recognized as mediocre quality for "batter-type" flours and thereby converting the same to quality flours for such specific purposes.

(17) Increasing the shelf life of flours and prepared mixes made therefrom by utilizing the combined effects of the preceding accomplishments numbered (7), (8) and (11).

(18) Creating new flour types by blending selected fractions (of our invention) of soft wheat flours with commercial hard wheat flours and also by blending fractions of our invention from hard wheat flours with commercial soft wheat flours to the end that the new products will better suit their ultimate uses and further, for substantial economy in the cost of the grain or flour sources employed.

(19) Production of commercially milled, special flours with depletion of protein and ash producing substances and lipoids and with precontrolled flour particle size range (below the size of practical sifter separations) which produce better qualities in cake, cookie, pastry and other batter type flours.

(20) Creation of new, mixed types of flours through the practice of our inventions by blending a selected concentrated fraction or a plurality of fractions (air separated in accordance with our inventive teachings) of different cereal flours such as rye, barley and wheat together or with one or more flour streams commercially milled, to enhance baking qualities and effect economies in production.

Summarizing generally advantages for three important types of flours, we point out as follows:

BREAD FLOURS

*(Including Wheat Flours, Rye Flours and Blends of the Two)*

(a) Substantial economy in the purchase of grains for the production of standard, highly acceptable bread flours and notable increase in the patent flour recoveries obtained therefrom.

(b) Improving quality characteristics including strength, volume, absorption, baking tolerance and color.

(c) Raising the protein content of commercially milled flours.

CAKE FLOURS

*(Including Layer Cakes and Angel Food)*

(a) Substantial economy in the purchase of grains for the production of standard, highly acceptable cake flours and notable increase in the patent flour recoveries obtained therefrom.

(b) Improving the qualities including cake volume, shapes, absorption, color and texture.

(c) Lowering the protein content.

(d) Obtaining more suitable particle sizes.

The term "cereal flour stocks" as used in the claims herein is expressly understood to means flour stocks of the group consisting of soft wheat, hard wheat, white rye, dark rye and corn flours.

The present application is a continuation of our co-pending application Serial No. 470,244, filed November 22, 1954.

APPENDIX A—EXHIBIT 1

*Centrifuge Sedimentation Method for Particle Size Distribution in "Flow-Dynamic Units"*

INTRODUCTION

The method described herein is used for the determination of a particular fluid-dynamic property or characteristic of a test sample representing a material consisting of small particles. The property or characteristic to be measured is a function of three factors: (1) shape, (2) density, and (3) size. The numerical results cannot be unequivocally expressed in known units of measurement such as definite units of length (while the physical dimension of this characteristic is length) and, therefore, the result is expressed in terms of units which are arbitrarily referred to as "flow-dynamic" units. These units correspond only in a general way with what is regarded as the effective diameter of the particle expressed in physical units of length such as microns. We do not attempt to measure directly "effective diameter" or "effective size." The use of this expression would imply a measurement of particles which are spherical or of identical shape but with different sizes. Wheat or other cereal flour particles have a wide diversity of shapes ranging from substantially spherical to particles having most irregular surfaces. The resistance of a particle to fluid-dynamic flow will be the result of shape and size. The third particle characteristic, i.e., density, influences the magnitude of the propelling force. The purpose of the method herein described is the differentiation and comparison of the fluid-dynamic property of particles moving in a liquid medium and the numerical expression of this property.

This method is an adaptation of known methods which have heretofore been employed for the measurement of particle "size." In the known methods, the term "size" is expressed in units of length, and this value is intended to describe average linear diameter of an abstract, imaginary particle which is spherical, and by some parameter which is equivalent to other particles of quite different shapes. In the present method, an assumption is made regarding the average shape of the particles in the calculation of the numerical figures representing the fluid-dynamic properties of the particles being examined. This assumption as to the average shape of the particles is introduced into the formula only as a practical aid in obtaining numerical results which very broadly approximate the average linear diameter of the particle in the fine sifter size range as observed under the microscope. As indicated before, the linear diameter is not a useful index when methods are employed for studying particles which vary tremendously in shape within any given samples and especially when the observer is concerned only with how the particles will behave when propelled through a fluid by gravity or centrifugal force.

It is conceivable that two particles having different shapes, sizes, and densities may move the same distance in the same time through a given fluid medium when the balance of moving force to the resistance is the same. The purpose of this method is to characterize these particles not in terms of shape or size or density, but by a numerical value based on the velocity with which the particles move through a given fluid under the influence of a force. The force of gravity alone was relied upon to move the particles by a method devised by K. T. Whitby and published in Bulletin No. 32 by the University of Minnesota (1950). An apparatus and method employing centrifugal force for the smaller particles was invented by Whitby and is disclosed and claimed in his co-pending application, Serial No. 329,411, filed January 2, 1953, and assigned to Pillsbury Mills, Inc.

These methods take into account the fact that for very small particles, the viscous resistance of a fluid such as benzene is very great in comparison with the weight of a particle. Thus, in the case of a small particle moving downwardly under the influence of gravity, a speed is soon reached known as the "terminal velocity" at which the retarding force of viscous resistance is equal to the weight of the particle.

In the simple case of falling spherical particles, the following equation applies and represents Stokes law:

$$6\pi R v \eta = \frac{4}{3}\pi R^3 (\rho - \rho_1) g$$

$R$=radius of the sphere, centimeters
$v$=terminal velocity, centimeters per second
$\eta$=the coefficient of viscosity of the medium in which the sphere is falling; poise, grams per centimeter per second
$\rho$=density of the particle, g./cm.$^3$
$\rho_1$=density of the medium in which the sphere is falling, g./cm.$^3$
$g$=acceleration of gravity, gravitational constant, 980 cm./sec.$^2$ Solving for terminal velocity we find:

$$v = \frac{2}{9} \frac{gR^2(\rho - \rho_1)}{\eta}$$

In the case of wheat flour particles, it is meaningless to use the term "radius," and, therefore, we substitute the "flow-dynamic" measuring unit F–D, which corresponds to what diameter is (2R) in the Stokes Law equation. Hence:

$$v = \frac{1}{18} g \, (\text{F--D})^2 \frac{(\rho - \rho_1)}{\eta} \frac{1}{10^8} \quad (1)$$

where $10^8$ is introduced to convert the dimension of F–D from centimeters to microns.

To determine the flow-dynamic properties of a sample of material we utilize a method to be described in detail below, which is based on the above equation.

Gravity sedimentation in a liquid is employed to determine the percentage of particles having an F-D value of 0.0040 cm. or larger. If a known distance is chosen and velocity expressed as $$\frac{h}{t}$$

the equation takes on the following form:

$$v=\frac{h}{t}=\frac{1g(\rho-\rho_1)(F-D)^2}{18\times 10^8\eta} \quad (2)$$

It is evident that there are only two variables, $t$ and F-D. If, a time, $t$, is chosen, the size that falls a known distance, $h$, can be determined by solving the equation for F-D.

After the particles having an F-D value over 0.0040 cm. have settled out by gravity, centrifugal force is applied to accelerate the settling rate of the smaller particles remaining in the sedimentation liquid.

In the centrifuge sedimentation part of this procedure, a modified form of the above formula is used. The gravitational constant, $g$, is replaced by the centrifugal acceleration which is $r\omega^2$ where $r$ is the variable radial distance between the rotational center and the location of the particle in the tube, $\omega$ is the angular velocity of the centrifuge and is a constant. Substituting in the above equation, the following is obtained:

$$v=\frac{dr}{dt}=\frac{1r\omega^2(F-D)^2(\rho-\rho_1)}{18\times 10^8\eta}$$

Separating the variables:

$$dt=\frac{18\times 10^8\eta}{\omega^2(F-D)^2(\rho-\rho_1)}\frac{dr}{r}=K\frac{dr}{r}$$

where K represents all the constants.

Integrating:

$$\int_0^t dt=K\int_{r_1}^{r_2}\frac{dr}{r}=K\ln\frac{r_2}{r_1}$$

Rearranging:

$$t=\frac{18\times 10^8\eta}{\omega^2(F-D)^2(\rho-\rho_1)}\ln\frac{r_2}{r_1} \quad (3)$$

If the time is chosen, the characteristic of the particle that travels a known distance can be determined by solving the equation for F-D.

The distance from the center of rotation to the top of the sedimentation liquid is $r_1$, and $r_2$ is the radius measured from the center of rotation to the bottom of the centrifuge tube generally.

In practice, the centrifuge portion is started after some settling has taken place by gravity. A correction has to be applied since the small particles have settled some already. This has been done by correcting the time by the factor equivalent to the distance a particular particle has fallen measured in time.

There are different ways of taking this into consideration, one of which is to determine the position of the particle at the start of the centrifuge step and establish the $r_1$ not to the top of the sedimentation liquid but at the position of the particle in the tube.

These two methods do result in differences in the first particle sizes measured by centrifuge, but the differences decrease as the particles measured become smaller.

HISTORY

The sedimentation method for particle size distribution was studied in the 1948-1949 research of K. T. Whitby of the University of Minnesota under the sponsorship of the Miller's National Federation. This work is published in Bulletin No. 32 of the University of Minnesota, 1950 (1). The outcome of this work was the adaptation of a Direct Weight Sedimentation Apparatus for use on flour mill stocks. This apparatus was used in Minneapolis Quality Control, Pillsbury Mills, Inc., in 1949-1950. Due to failure in attempts to overcome the objection to its cumbersome operation, it was abandoned in favor of the centrifuge technique which is still the standard test procedure in Pillsbury Milling Development. The Centrifuge Sedimentation Method started in June 1951.

The basic mathematics, physics, and assumptions are built on those published in the Whitby reference No. 1. The use of a shape factor parameter was carried over into the new Centrifuge Sedimentation Method with the modification that the assumed parameter (the Andreason's shape factor $-S_k=1.612$) is utilized only for the 40 flow-dynamic units and larger size particles. The sedimentation time of the 20-10-5 F-D unit size particles is computed with a shape factor of 1.0.

APPARATUS NECESSARY

The following apparatus should be available for the performance of this test:

(1) One special centrifuge with two speeds, 600 and 1200 r.p.m. A description of such a centrifuge is available in Ref. No. 2, FIG. 1.

(2) One tube holder to permit reading during the gravity sedimentation portion of the test run. A mechanical tapper may be a part, or may not be a part of this tube holder.

(3) Centrifuge tubes as described in Ref. No. 2, FIG. 3.

(4) A dispersing chamber, also described in Ref. No. 2, FIGS. 4 and 5.

(5) Cleaning wire, brush, and powder scoop. The powder scoop has a large and small pocket especially adjusted to measure approximately the correct volume of material directly into the disbursing chamber, approximately 25 mg. and 10 mg. respectively. These amounts of test material fill the capillary on the bottom of the centrifuge tube to a final sedimentation height of 10 to 20 mm.

(6) Centrifuge sedimentation tables. Special time schedule tables are prepared for each material of known density (flour—1.44 gr./cc.) requiring a certain optimum sedimentation liquid of known viscosity and density.

(7) Appropriate sedimentation liquid with the viscosity and density known to 1% or better accuracy. Benzene is one of the best sedimentation liquids available for flour mill products, such as wheat flour, and is used in this sedimentation test. Benzene has a specific gravity of 0.8715, and a viscosity of 0.00582 poise at 80° F.

8. Dispersion liquid. The specific gravity of the dispersion liquid should be at least 0.05 less than the specific gravity of the sedimentation liquid. A mixture of 75% benzene and 25% naptha gasoline produces the best dispersing liquid for use wtih benzene as sedimentation fluid. By maintaining a specific gravity difference of 0.05 between the dispersing liquid and the sedimentation liquid, the intermixing of the two liquids is prevented and the dispersing liquid can be floated on the surface of the sedimentation liquid, and thus an even distribution of the particles of the sample on the surface of the sedimentation liquid can be assured.

(9) Stop watch and holder. An ordinary 60 second sweep stop watch is satisfactory.

(10) Storage and dispensing containers for the sedimentation and dispersing liquids. An automatic pipette can be used to dispense the sedimentation liquid. Another convenient way to transfer the dispersing liquid to the dispersing chamber is by use of a medicine dropper.

(11) Data sheets.

METHOD OF OPERATION

The test is normally carried out in the following manner:

A centrifuge tube is first cleaned with the sedimentation liquid to be used. It is very important that no particles stick to the walls of the tube to disturb subsequent sedimentation tests. The cleaning wire and brush should be used after every test with benzene as the cleaning fluid.

The properly cleaned tube is then filled to within 6–7 mm. of the top with the sedimentation liquid and placed in the tube holder.

The flour is dispersed directly into the chamber which is small enough to cap with the finger tips. The screened end is considered the bottom. The following is the general method of starting the sedimentation:

(1) Place two level scoopfulls (small end) of flour into the chamber.
(2) Add 0.8 ml. (approximately) of dispersion liquid.
(3) Shake vigorously for 30 seconds, stop and release pressure.
(4) Cap the top with a finger and remove finger from bottom.
(5) Place chamber on the tube, release finger and start stop watch.
(6) Remove chamber with a twisting motion. This will leave a sharp layer of dispersion liquid.

If a tapping device is used, it should be started and the readings of the sedimentation height on the bottom of the capillary are made according to the time schedule. If no mechanical tapping device is available, satisfactory results can be obtained by hand tapping with a light metal rod.

The particles settle through the sedimentation liquid in accordance with the principles of Stokes' law and the coarser particles will settle more rapidly than the finer ones. The settling time of the coarser particles with only the force of gravity acting upon them is relatively short, and therefore particles down to approximately 40 flow-dynamic units in size are allowed to settle without applying the centrifuge. When the gravity settling period has been completed, the tube is placed in the centrifuge. The weight of the full sedimentation tube is counterbalanced on the other side of the centrifuge arm by a similar sedimentation tube with liquid. The centrifuge is run at the specified speed according to the time schedule presented below. It is stopped at time intervals to make readings of the material height in the capillary bottom of the sedimentation tube. To determine the end point where all particles have settled, a speed and time are chosen which will completely clarify the suspension.

TABLE I

*Time Table Schedule for Gravity Sedimentation*

| Flow-dynamic units | Chosen shape factor parameter | Col. ht. reading time, seconds | Col. ht. reading time, min. and sec. |
|---|---|---|---|
| 200 | 1.612 | 12.4 | |
| 180 | 1.612 | 15.9 | |
| 160 | 1.612 | 19.3 | |
| 140 | 1.612 | 25.5 | |
| 120 | 1.612 | 34.4 | |
| 100 | 1.612 | 49.5 | |
| 80 | 1.612 | 77.1 | 1: 17.1 |
| 60 | 1.612 | 137.0 | 2: 17.0 |
| 50 | 1.612 | 198.0 | 3: 18.0 |
| 40 | 1.612 | 309.0 | 5: 09.0 |

The reading times for the chosen units in Table I were computed from a modification of Formula 2. The modified formula, including the shape factor parameter, is as follows:

$$(F-D)^2 = \frac{18 \times 10^3 \eta h}{(\rho - \rho_1) g t} (S_k)^2$$

Solving the equation for time ($t$):

$$t = \frac{18 \times 10^3 \eta h}{(\rho - \rho_1) g (F-D)^2} (S_k)^2 \quad (4)$$

For our test the factors in this formula are:

$t$ = time in seconds
$\eta$ = 0.00582 viscosity of benzene in poise on 80° F., a constant.
$h$ = 10 cm., the height of the sedimentation liquid in the tube, a constant.
$\rho$ = 1.440 gr./cm.$^3$ the average specific gravity of flour, an assumed constant here.
$\rho_1$ = 0.8715 gr./cm.$^3$ the specific gravity of benzene at 80° F., a constant.
$g$ = 980 cm./sec.$^2$, a constant.
$F-D$ = flow-dynamic units of size, microns.
$S_k$ = 1.612 shape factor parameter.

The above formula is a mathematical definition of flow-dynamic units.

The reading time schedule, Table II, for the centrifuge sedimentation part of the test is derived from Equation 3. After the introduction of the shape factor parameter here, the centrifuge sedimentation time for a certain flow-dynamic unit is:

$$T_y = \frac{18 \times 10^3 \eta}{(\rho - \rho_1) \omega^2 (F-D)^2} \frac{\ln r_2}{r_1} (S_k)^2 \quad (5)$$

$S_k$ = 1.0 shape factor, parameter
$r_1$ = 3.4 cm.
$r_2$ = 13.4 cm.

One short way to apply this formula to the organization of the time table schedule is explained in detail here. While the gravity sedimentation time schedule readings are calculated from the beginning of the sedimentation, this centrifuge sedimentation time schedule is figured in centrifuge running time from the beginning of centrifuge sedimentation. The above formula figures the centrifuge time from the first beginning of the sedimentation (same as gravity sedimentation formula), therefore, the basic formula is adjusted in the following manner:

$$T_y = \frac{18 \times 10^3 \eta}{(\rho - \rho_1) \omega^2 (F-D)^2} \frac{\ln r_2}{r_1} \frac{(t_y - t_{40})}{(t_y)}$$

Where $t_{40}$ means gravity sedimentation time in seconds of the 40 F–D size particle, $t_y$ is the gravity sedimentation time of a chosen F–D size particle smaller than 40 F–D.

After the calculation of the centrifuge times for the chosen sizes, only two adjustments must be made for practical use:

(1) Adjust centrifuge times to compensate for readings taken at larger units (time clock settings). Note Table II where 10 units require 61 seconds but in practice 12.2 seconds is used for 20 units so only an additional 48.8 seconds is required in going from 20 to 10 units.

(2) Correction to compensate for starting (acceleration) and stopping (deacceleration) of the centrifuge. This must be applied to each interval to be observed.

TABLE II

*Time Table Schedule for the Centrifuge Sedimentation*

| Fow-dynamic units | Chosen shape factor | Col. ht. reading time, seconds uncorrected, 600 r.p.m. | Time clock setting intervals for each test run, uncorrected seconds | Time clock setting for each test run (corrected +5.2 seconds [1]) |
|---|---|---|---|---|
| 20 | 1.0 | 12.2 | 12.2 | 17.4 |
| 10 | 1.0 | 61.0 | 48.8 | 54.0 |
| 5 | 1.0 | 256.0 | 195.0 | 200.2 |
| 0 | | | | ([2]) |

[1] The correction is necessary to compensate for the errors introduced by acceleration and deacceleration periods in the test runs.
[2] 5 min. 1,200 r.p.m.

Observe that the height of the column of particles which have collected in the capillary narrowed bottom of the sedimentation tube is directly proportional to the volume of the particles settled. Therefore, by taking readings at the time intervals listed in the above table and by noting the height of the column in the capillary, we have determined the relative particle size distributions. In the following table, we illustrate a typical particle size distribtuion data sheet.

TABLE III

| Flow-dynamic Units | Settling time, min. sec. | Observed col. ht., mm. | Difference col. ht., mm. | Percent in particle size range | Percent finer than size |
|---|---|---|---|---|---|
| 160 | 19.3 | 0.0 | | | 100.0 |
| | | | 0.4 | 2.3 | |
| 140 | 25.5 | 0.4 | | | 97.3 |
| | | | 2.6 | 14.7 | |
| 120 | 34.7 | 3.0 | | | 83.0 |
| | | | 3.9 | 22.0 | |
| 100 | 49.5 | 6.9 | | | 61.0 |
| | | | 3.0 | 17.0 | |
| 80 | 1:17 | 9.9 | | | 44.0 |
| | | | 2.3 | 13.0 | |
| 60 | 2:17 | 12.2 | | | 31.0 |
| | | | 3.0 | 16.9 | |
| 40 | 5:10 | 15.2 | | | 14.1 |
| | | | 1.7 | 9.6 | |
| 20,600 r.p.m | 17.5 | 16.9 | | | 4.5 |
| | | | 0.5 | 2.8 | |
| 10,600 r.p.m | 54.0 | 17.4 | | | 1.7 |
| | | | 0.3 | 1.7 | |
| 0, 1,200 r.p.m | 5:0 | 17.7= | | 100.0 | |

A plot is made on semi-logarithmic-three cycle paper using flow-dynamic units as the abscissa and percent finer-than-size as the ordinate. The abscissa should be on the three cycle logarithmic side.

LIST OF REFERENCES (1) K. T. Whitby, Determination of Particle Size Distribution, Apparatus and Technique for Flour Mill Dust. Bulletin No. 32, University of Minnesota.

(2) K. T. Whitby, Method and Apparatus for Determining Particle Size Distribution of Finely Divided Materials. Patent application, Serial No. 329,411, filed January 2, 1953.

APPENDIX B

*Explanation of Velocity and Force Conditions (With Force Conditions in Equilibrium) When Particles Are Subjected to Vortex-Type Air Separation*

In general, vortex-type, air classifiers as known from the literature and authorities, use the following classification principle:

A combined or resultant air flow of vortex and sink flows is created by some usually mechanical rotary or stationary means (cyclone). Particles of the material to be classified are fed into and suspended in this vortex-sink flow.

Referring to FIG. 20 of the drawings, in the plane perpendicular to the axis of the vortex-sink flow, velocity conditions change in such a manner that for a definite $d$ size patricle the radial component of the flow dymanic drag $D_R$ will be in balance with the centrifugal force $C_R$ which acts on the particle at the radius R. The forces in balance have to be expressed with the velocity variables and by some measurements for the definite $d$ size. For the centrifugal force equation:

$$C_R = \rho \text{ particle} \cdot \frac{\pi d^3}{6} \cdot v_T^2/R$$

supplies a relationship which is taken from the law of kinetics.

For the radial component of flow dynamic drag $$D_R = \frac{1}{2} \rho \text{ fluid} \cdot d^2 \cdot \frac{\pi}{4} \cdot v_R^2 \cdot \epsilon$$

represents a relationship as quoted by J. M. Dallavalle in his book "Micromeritics," page 22, published (second edition) 1948 by Pitman Publishing Co. of New York city, New York.

Since for definite $d$ size particles on the path of a circle described by the radius R, forces are in equilibrium ($C_R$ and $D_R$) pointing in opposite directions (see FIG. 20), $C_R = D_R$ Arranging the above relationships for $d$ $$d = \frac{3}{4} \cdot \frac{\rho \text{ fluid}}{\rho \text{ particles}} \cdot \left(\frac{v_R}{v_T}\right)^2 \cdot R \cdot \epsilon$$

where:

$d$ = critical diameter of sperical particle (cm.)
$\rho$ fluid = density of fluid (gr./cm.$^3$)
$\rho$ particle = density of particle (gr./cm.$^3$)
$v_R$ = radial velocity of fluid and particle at critical radius (cm./sec.)
$v_T$ = tangential velocity of fluid and particle at critical radius (cm./sec.)
   (Note: From a practical viewpoint, the differences in the velocities of particle and fluid are negligible.)
R = critical radius (cm.)
$\epsilon$ = Drag factor (no dimension) specified and measured by Dallavalle supra, quoting Wadell.
  (a) $\sqrt{\epsilon} = 0.63 - 4.8/\sqrt{R_e}$ for the total span of the practical Reynolds number range.
  (b) $\epsilon = 0.4 + 40/R_e$ in the Reynolds number range.

$$2 < R_e < 500$$

$R_e$ = Reynolds number (no dimension) defined as follows:

$$R_e = \rho \text{ fluid} \cdot d \cdot v_R / \mu_0.$$

$\mu$ = viscosity of fluid (gr./cm.·sec.)

The foregoing presentation of formula has been available from the authorities quoted as well as other authorities, but to our knowledge, has not been used on a practical scale to determine measurements of "critical cut" of air separation processes. We did make use of it and found it helpful in determining our various adjustments and designs of efficient vortex air separating machines.

APPENDIX C

*Relative Shape Factor Data*

The following tabulation (which should be referred to in conjunction with FIG. 19 of the drawings) presents relative shape factor data based on very careful selection of 40 particles applying on them 60 actual measurements and after averaging and arranging data:

| Sedimentation column, millimeters | Particle size in F-D units | $\phi$ Micron | $\phi$ starch micron | $\Phi/\phi$ | $\Phi/\phi$ starch | $A\phi/A\phi$ starch | $A\Phi/A\phi$ | $A\Phi/A\phi$ starch |
|---|---|---|---|---|---|---|---|---|
| 0-1 | 20 | 10.6 | 11.1 | 1.93 | 1.87 | 0.93 | 3.78 | 3.5$_2$ |
| 2-3 | 10 | 12.9 | 9.5 | 1.47 | 2.00 | 1.93 | 2.13 | 4.1$^-$ |
| 5-6 | 5 | 11.4 | 9.5 | 1.50 | 1.80 | 1.45 | 2.25 | 3.$_{27}$ |
| 10-11 | 2 | 7.0 | 6.0 | 2.0 | 2.34 | 1.36 | 3.84 | 5.$_2$ |
| Relative shape factor sub-averages | | | | 1.76 | 2.0 | 1.42 | 3.00 | 4.02 |
| Relative shape factor averages | | | | linear | 1.88 | areal | 2.48 | |

Where symbols with the explanation of FIGURE NO. 19:

$\Phi$ equals maximum linear measurement of projected image of protein-matter particle—actually measured.

$A\Phi$ equals area of circle, which has $\Phi$ diameter, postulated.

$\phi$ starch equals larger diameter of projected image of starch granule spheroid at the position of maximum stability; image very near approximation of a circle—actually measured.

$A\phi$ starch equals area of circle with $\phi$ starch diameter, postulated.

$\phi$ equals the diameter of a circle of which area is equivalent to the projected area of protein-matter particle at the position of maximum stability (area shaded on FIG. 19), postulated.

A$\phi$ equals the area of circle with $\phi$ diameter, actually measured.

The proof of the very high, protein concentration achieved by our invention at previously unknown low critical-cut air separations is apparent from the foregoing, with the general explanation contained in columns 9 to 11 of the patent specification.

What is claimed is:

1. The process of producing a high-protein food product, said process comprising subjecting a cereal flour consisting of a mixture of heterogeneous particles some of which consist principally of starch and others of which consist principally of protein and selected from the group consisting of wheat flour, rye flour and corn flour, to an air current, fractionating said flour suspended in said air current at a cut above about 20 F–D units and below the neutral critical cut of the flour being fractionated by suspending the fine fraction in one stream of said current and the coarse fraction in another stream of said current and separately collecting the fine fraction and the coarse fraction, and utilizing said fine fraction in the preparation of baked goods.

2. The process of producing a high-protein cereal flour product, said process comprising subjecting a cereal flour consisting of a mixture of heterogeneous particles some of which consist principally of starch and others of which consist principally of protein and selected from the group consisting of wheat flour, rye flour and corn flour, to an air current, fractionating said flour suspended in said air current at a cut above about 20 F–D units and below the neutral critical cut of the flour being fractionated by suspending the fine fraction in one stream of said current and the coarse fraction in another stream of said current and collecting said fine fraction and then combining said collected fine fraction with a second cereal flour lower in protein content than said collected fine fraction to fortify said second cereal flour in protein.

3. The process of producing a high-protein cereal flour product, said process comprising subjecting a cereal flour consisting of a mixture of heterogeneous particles some of which consist principally of starch and others of which consist principally of protein and selected from the group consisting of wheat flour, rye flour and corn flour, to an air current, fractionating said flour suspended in said air current at a cut above about 20 F–D units and below the neutral critical cut of the flour being fractionated by suspending the fine fraction in one stream of said current and the coarse fraction in another stream of said current, and then combining said fine fraction with a second cereal flour lower in protein content than said fine fraction to fortify said second cereal flour in protein.

4. The process of producing a high-protein cereal flour product, said process comprising subjecting a white rye cereal flour consisting of a mixture of heterogeneous particles, some of which consist principally of starch and others of which consist principally of protein to an air current, fractionating said flour suspended in said air current at a cut above about 15 and below 52 F–D units by suspending the fine fraction in one stream of said current and the coarse fraction in another stream of said current, and then combining said fine fraction with a second cereal flour lower in protein content than said fine fraction to fortify said second cereal flour in protein.

5. The process of producing a high-protein cereal flour product, said process comprising subjecting a dark rye cereal flour consisting of a mixture of heterogeneous particles, some of which consist principally of starch and others of which consist principally of protein to an air current, fractionating said flour suspended in said air current at a cut above about 18 and below 40 F–D units by suspending the fine fraction in one stream of said current and the coarse fraction in another stream of said current, and then combining said fine fraction with a second cereal flour lower in protein content than said fine fraction to fortify said second cereal flour in protein.

6. The process of producing a high-protein cereal flour product, said process comprising subjecting a corn cereal flour consisting of a mixture of heterogeneous particles, some of which consist principally of starch and others of which consist principally of protein to an air current, fractionating said flour suspended in said air current at a cut above about 20 and below 36 F–D units by suspending the fine fraction in one stream of said current, and the coarse fraction in another stream of said current, and then combining said fine fraction with a second cereal flour lower in protein content than said fine fraction to fortify said second cereal flour in protein.

References Cited in the file of this patent

UNITED STATES PATENTS

| | | |
|---|---|---|
| 2,303,448 | Fisher et al. | Dec. 1, 1942 |
| 2,355,028 | Musher | Aug. 1, 1944 |
| 2,466,260 | Musher | Apr. 5, 1949 |
| 2,554,869 | Musher | May 29, 1951 |

OTHER REFERENCES

"Cereal Chemistry," vol. 24 (1947), pages 381–393, pages 381–388 relied on.

"Cereal Chemistry," vol. 25 (1948), pages 155–167.

"Deutsche Müller Zeitung," No. 17 (1952), pages 417–418.